United States Patent [19]
Kinugasa et al.

[11] Patent Number: 5,746,052
[45] Date of Patent: May 5, 1998

[54] EXHAUST GAS PURIFICATION DEVICE FOR AN ENGINE

[75] Inventors: Yukio Kinugasa; Kouhei Igarashi, both of Susono; Takaaki Itou; Takehisa Yaegashi, both of Mishima; Toshifumi Takaoka, Susono, all of Japan

[73] Assignee: Toyota Jidosha Kabushiki Kaisha, Aichi, Japan

[21] Appl. No.: 525,892

[22] Filed: Sep. 8, 1995

[30] Foreign Application Priority Data

Sep. 13, 1994 [JP] Japan .................................. 6-218800
Aug. 9, 1995 [JP] Japan .................................. 7-203586

[51] Int. Cl.$^6$ .................................................. F01N 3/20
[52] U.S. Cl. ...................... 60/274; 60/276; 60/288; 60/289; 422/171; 423/213.7
[58] Field of Search .................. 60/274, 276, 289, 60/288; 422/170, 171; 423/213.7

[56] References Cited

U.S. PATENT DOCUMENTS

| | | |
|---|---|---|
| 3,767,764 | 10/1973 | Dolbear . |
| 3,810,361 | 5/1974 | Weaving ........................ 423/213.7 |
| 3,825,654 | 7/1974 | Kobylinski et al. . |
| 3,953,576 | 4/1976 | Meguerian ..................... 423/213.7 |
| 4,321,792 | 3/1982 | Achard ................................ 60/289 |
| 4,393,031 | 7/1983 | Henke .......................... 423/213.7 |
| 4,521,388 | 6/1985 | Samish et al. . |
| 5,120,695 | 6/1992 | Blumrich et al. . |
| 5,292,991 | 3/1994 | Lachman et al. . |
| 5,409,671 | 4/1995 | Takemoto et al. . |

FOREIGN PATENT DOCUMENTS

| | | |
|---|---|---|
| A-1453456 | 10/1976 | European Pat. Off. . |
| A-0510498 | 10/1992 | European Pat. Off. . |
| A-4314896 | 11/1993 | European Pat. Off. . |
| 53-86917 | 7/1978 | Japan . |
| 1-280617 | 11/1989 | Japan . |
| 4-365920 | 12/1992 | Japan . |

OTHER PUBLICATIONS

Database WPI, Section Ch, Week 9432, Derwent Publications Ltd., London, GB; Class E19, AN 94-259675, XP002025404 & JP 06 190 246 (Idemitsu Kosan Co., Ltd.), Jul. 12, 1994.

*Primary Examiner*—Douglas Hart

[57] ABSTRACT

In the present invention, the exhaust gas from the engine is divided into a first and a second branch exhaust passages after it passes through a three-way reducing and oxidizing catalyst, and the two branch exhaust passages merge into an exhaust gas outlet passage. In the first branch exhaust passage, an oxidizing catalyst is disposed, and in the exhaust gas outlet passage, a denitrating and oxidizing catalyst is disposed. $NO_x$ in the exhaust gas from the engine is all converted to $N_2$ and $NH_3$ by the three-way reducing and oxidizing catalyst and a part of the $NH_3$ generated by the three-way catalyst flows into the first branch exhaust passage and is converted to $NO_x$ again by the oxidizing catalyst. The amount of $NO_x$ produced by the oxidizing catalyst and the amount of $NO_x$ flowing through the second branch exhaust passage is determined by the flow distribution ratio of the first and the second branch exhaust passages. In this invention, the flow ratio is determined in such a manner that the amount of the $NO_x$ produced by the oxidizing catalyst and the amount of the $NH_3$ passing through the second branch exhaust passage are stoichiometric to produce $N_2$ and $H_2O$. Therefore, when these exhaust gases flow into the denitrating and oxidizing catalyst after they mix with each other in the exhaust gas outlet passage, all the $NO_x$ and the $NH_3$ are converted to $N_2$ and $H_2O$ by the denitrating and oxidizing catalyst without producing any surplus $NO_x$ or $NH_3$.

27 Claims, 9 Drawing Sheets

Fig.9

| SYMBOL | PART | NOx (ppm) | NH₃ (ppm) | HC (ppm) | CO (ppm) | λ |
|---|---|---|---|---|---|---|
| (I) | ENGINE OUTLET | 2000 | 0 | 2000 | 10000 | 0.99 |
| (II) | THREE-WAY CATALYST OUTLET | 0 | 100 | 20 | 50 | 0.99 |
| (III) | OXIDIZING CATALYST INLET | 0 | 95 | 19 | 48 | 1.05 |
| (IV) | OXIDIZING CATALYST OUTLET | 95 | 0 | 2 | 10 | 1.05 |
| (V) | DENITRATING AND OXIDIZING CATALYST INLET | 43 | 57 | 12 | 32 | 1.02 |
| (VI) | DENITRATING AND OXIDIZING CATALYST OUTLET | 10 | 0 | 2 | 10 | 1.02 |

Fig.10

| SYMBOL | PART | NOx (ppm) | NH₃ (ppm) | HC (ppm) | CO (ppm) | λ |
|---|---|---|---|---|---|---|
| (I) | ENGINE OUTLET | 2000 | 0 | 2000 | 10000 | 0.995 |
| (II) | THREE-WAY CATALYST INLET | 0 | 100 | 20 | 50 | 0.995 |
| (III) | OXIDIZING CATALYST INLET | 0 | 99 | 20 | 49 | 1.00 |
| (IV) | OXIDIZING CATALYST OUTLET | 25 | 26 | 14 | 10 | 1.00 |
| (V) | DENITRATING AND OXIDIZING CATALYST INLET | 24 | 25 | 12 | 9 | 1.02 |
| (VI) | DENITRATING AND OXIDIZING CATALYST OUTLET | 10 | 0 | 2 | 8 | 1.02 |

EXHAUST GAS PURIFICATION DEVICE FOR AN ENGINE

BACKGROUND OF THE INVENTION

1. Field of the Invention

The present invention relates to an exhaust gas purification device for an internal combustion engine. More specifically, the present invention relates to a device which is capable of effectively removing HC, CO and $NO_x$ components from the exhaust gas.

2. Description of the Related Art

An exhaust gas purification device utilizing a three-way reducing and oxidizing catalyst is commonly used for removing HC, CO and $NO_x$ components from the exhaust gas of an internal combustion engine (in this specification, the term $NO_x$ means a nitrogen oxide such as NO, $NO_2$, $N_2O$ and $N_3O_4$, in general). The three-way reducing and oxidizing catalyst is capable of oxidizing HC and CO components, and reducing $NO_x$ components in the exhaust gas, when the air-fuel ratio of the exhaust gas is the stoichiometric air-fuel ratio. Namely, the three-way reducing and oxidizing catalyst is capable of removing these harmful components from exhaust gas simultaneously when the air-fuel ratio of the exhaust gas is the stoichiometric air-fuel ratio.

However, even when the air-fuel ratio of the exhaust gas is the stoichiometric air-fuel ratio, the three-way reducing and oxidizing catalyst cannot remove 100% of HC, CO, and $NO_x$ components in the exhaust gas, and a small amount of these components pass through the catalyst.

Further, the ability of the three-way reducing and oxidizing catalyst for oxidizing HC and CO components becomes lower when the air-fuel ratio of the exhaust gas becomes rich (i.e., when the air-fuel ratio becomes lower than the stoichiometric air-fuel ratio). However, the ability of the three-way reducing and oxidizing catalyst for reducing $NO_x$ components also becomes lower when the air-fuel ratio of the exhaust gas becomes lean (i.e., as the air-fuel ratio becomes higher than the stoichiometric air-fuel ratio). Therefore, when the air-fuel ratio of the exhaust gas deviates from the stoichiometric air-fuel ratio, such as in a transient operation of the engine, the amount of HC and CO, or $NO_x$ passing through the catalyst increases.

Though HC and CO components, even when they pass through the three-way reducing and oxidizing catalyst, can be removed by disposing an oxidizing catalyst downstream of the three-way reducing and oxidizing catalyst, it is difficult to remove the $NO_x$ components, especially a small amount of $NO_x$ components, from the exhaust gas. Therefore, when the three-way reducing and oxidizing catalyst is used, it is difficult to remove $NO_x$ components completely from the exhaust gas of the engine.

To solve this problem, Japanese Unexamined Patent Publication (Kokai) No. 4-365920 discloses an exhaust gas purification device utilizing a denitrating reaction.

When the air-fuel ratio of the exhaust gas is lower than the stoichiometric air-fuel ratio, the three-way reducing and oxidizing catalyst converts a portion of the $NO_x$ in the exhaust gas to an $NH_3$ component while reducing most of the $NO_x$ components in the exhaust gas and converting it into an $N_2$ component. It is known that $NH_3$ reacts with $NO_x$ and produce $N_2$ and $H_2O$ by the denitrating reaction.

In JPP'920, a multiple-cylinder internal combustion engine is used, and a group of cylinders of the engine are operated at a rich air-fuel ratio while other cylinders are operated at a lean air-fuel ratio. Further, a three-way reducing and oxidizing catalyst, having a high capability for converting $NO_x$ to $NH_3$, is disposed in an exhaust gas passage connected to the rich air-fuel ratio cylinders. After it flows through the three-way reducing and oxidizing catalyst, the exhaust gas from the rich air-fuel ratio cylinders mixes with the exhaust gas from the lean air-fuel ratio cylinders. Since, when the exhaust gas from the rich air-fuel ratio cylinders flows through the three-way reducing and oxidizing catalyst, a portion of $NO_x$ component in the exhaust gas is converted to an $NH_3$ component, the exhaust gas downstream of the three-way reducing and oxidizing catalyst contains a relatively large amount of an $NH_3$ component. On the other hand, the exhaust gas from the lean air-fuel ratio cylinders contains a relatively large amount of $NO_x$. Therefore, by mixing the exhaust gas from the three-way reducing and oxidizing catalyst and the exhaust gas from the lean air-fuel ratio cylinders, the $NH_3$ component in the exhaust gas from the three-way reducing and oxidizing catalyst reacts with the $NO_x$ component in the exhaust gas from the lean air-fuel ratio cylinder, and $NH_3$ component and $NO_x$ component produce $N_2$ and $H_2O$ by a denitrating reaction. Thus, according to the device in JPP'920, $NO_x$ in the exhaust gas is removed from the exhaust gas.

In the device in JPP'920, though all of $NO_x$ can, theoretically, be removed from the exhaust gas, it is necessary to control the amount of $NH_3$ and $NO_x$ in the exhaust gas precisely in such a manner that the $NH_3$ and $NO_x$ react each other to produce $N_2$ and $H_2O$ without causing surplus $NH_3$ or $NO_2$. For example, $NO_x$ generated by the internal combustion engine is mainly composed of NO, and the NO reacts with $NH_3$ to produce $N_2$ and $H_2O$ by the following denitrating reaction.

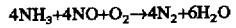

$$4NH_3 + 4NO + O_2 \rightarrow 4N_2 + 6H_2O$$

To convert all of NO and $NH_3$ to $N_2$ and $H_2O$ and to prevent surplus $NH_3$ and NO from being discharged to atmosphere, it is necessary to adjust the amounts of $NH_3$ and $NO_x$ (in this case, NO) so that the amounts of $NH_3$ and $NO_x$ become precisely the stoichiometrical ratio to produce $N_2$ and $NH_3$.

However, in the device in JPP'920, since $NH_3$ is generated by converting the $NO_x$ in the exhaust gas from the cylinders operated on a rich air-fuel ratio, and $NO_x$ is generated by the cylinders operated on a lean air-fuel ratio, the amount of $NH_3$ generated by the three-way reducing and oxidizing catalyst and the amount of $NO_x$ generated by the cylinders operated on a lean air-fuel ratio must be precisely controlled to maintain stoichiometry.

Since the amounts of $NO_x$ generated by the cylinders varies in accordance with engine operating conditions such as engine load and engine speed, it is required to control the air-fuel ratio of the respective cylinders very precisely in accordance with the engine operating conditions to control the required ratio of the amounts of $NO_x$ and $NH_3$. In the actual operation of the engine, it is almost impossible to control the air-fuel ratio to such a precision in all of the operating conditions of the engine. Therefore, in the device in JPP'920, it is difficult to maintain the stoichiometry of $NH_3$ and $NO_x$, and surplus $NH_3$ or $NO_x$ are discharged to atmosphere in certain engine operating conditions.

SUMMARY OF THE INVENTION

In view of the problems in the related art, the object of the present invention is to provide an exhaust gas purification device for an engine which is capable of efficiently removing HC, CO, and $NO_x$ components in the exhaust gas, and especially the $NO_x$ component from the exhaust gas of the engine.

The above object is achieved by an exhaust gas purification device for an engine according to the present invention, in which the device comprises a components ratio determining means disposed in an exhaust gas passage of an internal combustion engine, for converting substantially all of the $NO_x$ components in the exhaust gas into an $N_2$ component, an $NH_3$ component and $NO_x$ components, wherein the amount of the $NH_3$ component and the amount of the $NO_x$ components generated by the conversion are adjusted in such a manner that the amount of the $NH_3$ component and the amount of the $NO_x$ components are stoichiometrical to produce $N_2$ and $H_2O$ components, and a purification means disposed on the exhaust gas passage downstream of the components ratio determining means for causing the $NH_3$ component react with the $NO_x$ components generated by the components ratio determining means to produce $N_2$ and $H_2O$ components.

According to the present invention, $NH_3$ and $NO_x$ are generated by converting $NO_x$ in the same exhaust gas, instead of generating $NH_3$ and $NO_x$ separately, i.e., most of the $NO_x$ (e.g., NO) in the exhaust gas from the engine is converted to $N_2$ and remaining $NO_x$ in the exhaust gas is converted to $NH_3$ and $NO_x$, and the amounts of $NH_3$ and $NO_x$ are stoichiometrical to produce $N_2$ and $H_2O$. Therefore, even when the total amount of $NO_x$ generated by the engine is changed, the stoichiometry of the amount of $NH_3$ and $NO_x$ are maintained.

According to one aspect of the present invention, the component ratio determining means further comprises, an $NH_3$ generating means for converting substantially all of the $NO_x$ components in the exhaust gas into an $N_2$ component and an $NH_3$ component, and a $NO_x$ generating means for converting a portion of the $NH_3$ component generated by the $NH_3$ generating means into $NO_x$ components, wherein the amount of $NO_x$ components generated by the $NO_x$ generating means and the amount of remaining $NH_3$ component are adjusted in such a manner that the amount of the $NO_x$ components and the amount of the remaining $NH_3$ component are stoichiometrical to produce $N_2$ and $H_2O$ components.

In this aspect of the invention, all of the $NO_x$ in the exhaust gas is first converted to $N_2$ and $NH_3$, then a portion of the $NH_3$ is converted to $NO_x$. Therefore, the ratio of the amounts of converted $NO_x$ and remaining $NH_3$ can be easily controlled, and the stoichiometry of the amounts of $NO_x$ and $NH_3$ can be precisely maintained.

According to another aspect of the present invention, the above $NO_x$ generating means further comprises a first branch exhaust passage and a second branch exhaust passage which divide the exhaust gas flow containing the $NH_3$ component generated by the $NH_3$ generating means, a converting means disposed on the first branch exhaust passage for converting substantially all of the $NH_3$ component in the exhaust gas flow through the first branch exhaust passage into $NO_x$ components, and an exhaust gas outlet passage merging the first and the second branch exhaust passage, where the exhaust gas which flows through the first branch exhaust passage and the exhaust gas which flows through the second branch exhaust passage mix with each other, wherein the amount of the exhaust gas flowing through the first branch exhaust passage and the amount of the exhaust gas flowing through the second branch exhaust passage are adjusted in such a manner that the amount of the $NO_x$ component generated by the converting means and the amount of the $NH_3$ component in the exhaust gas flowing through the second branch exhaust passage are stoichiometrical to produce $N_2$ and $H_2O$ components.

In this aspect of the invention, the exhaust gas containing $NH_3$ is divided by the first and second branch exhaust passages, and the all of $NH_3$ in the exhaust gas flowing into the first branch exhaust passage is converted to $NO_x$. Therefore, the ratio of the $NO_x$ and $NH_3$ in the exhaust gas after mixing in the exhaust gas outlet passage is determined by the ratio of flow rates in the first branch exhaust passage and the second branch exhaust passage. Thus, the stoichiometry of $NO_x$ and $NH_3$ can be maintained by setting the ratio of flow rates of the first and the second branch exhaust passage.

BRIEF DESCRIPTION OF THE DRAWINGS

The present invention will be better understood from the description, as set forth hereinafter with reference to the accompanying drawings in which:

FIG. 9 is a drawing showing an example of the result obtained by an experiment using the device in FIG. 1;

FIG. 10 is a drawing showing an example of the result obtained by an experiment using the device in FIG. 5;

DESCRIPTION OF THE PREFERRED EMBODIMENT

Figure 1:
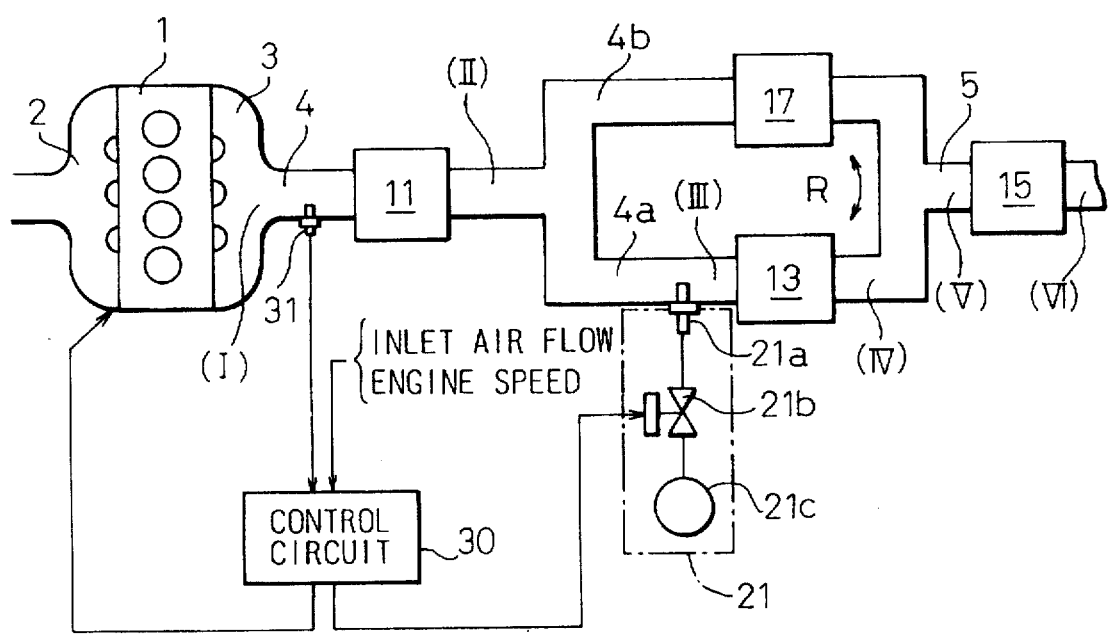
FIG. 1 is a drawing schematically illustrating an embodiment of the present invention when applied to an automobile engine.

FIG. 1 schematically illustrates an embodiment of the exhaust gas purification device according to the present embodiment. In FIG. 1, reference numeral 1 designates a multiple-cylinder type internal combustion engine and 2 designates an intake air passage of the engine 1. Numeral 3 is an exhaust manifold which connects exhaust ports of the respective cylinders of the engine 1 to an exhaust gas passage 4. A three-way reducing and oxidizing catalyst 11 is disposed in the exhaust gas passage 4.

In this embodiment, the exhaust gas passage 4 diverges into two branch exhaust passages 4a and 4b. In the first branch exhaust passage 4a, an oxidizing catalyst 13 is provided, and in the second branch exhaust passage 4b, a resistance body 17, which generates approximately the same flow resistance as the oxidizing catalyst 13, is disposed. The oxidizing catalyst 13 and the resistance body 17 are explained later in detail.

The first branch exhaust passage 4a and the second branch exhaust passage 4b are merged into an exhaust gas outlet passage 5, and a denitrating and oxidizing catalyst 15 is disposed on the exhaust gas outlet passage 5. The exhaust gas outlet passage 5 opens to atmosphere via a muffler (not shown) disposed in the exhaust gas outlet passage downstream of the denitrating and oxidizing catalyst 15.

In FIG. 1, numeral 21 shows a secondary air supplying unit which injects air into the first branch exhaust passage 4a at the portion upstream of the oxidizing catalyst 13. The secondary air supply unit 21 includes a pressurized air source 21c such as an air pump, an air injection nozzle 21a which injects the air from the air source 21 into the branch exhaust passage 4a, and a flow control valve 21b which adjusts the injection rate of the air from the nozzle 21a in accordance with a control signal from an engine control circuit 30.

The engine control circuit 30 consists of, for example, a micro computer which comprises a RAM, a ROM, a CPU and input and output ports connected each other by a bi-directional bus. The control circuit 30 performs basic control of the engine 1 such as a fuel injection control and an air-fuel ratio control. In addition to that, the control circuit 30 controls the injection rate of the secondary air by controlling the flow control valve 21b of the secondary air supply unit 21 in this embodiment.

In order to perform these controls, various signals representing the operating conditions of the engine 1 are fed to the input ports of the control circuit 30. These signals are, for example, an inlet air signal from an air-flow meter (not shown) disposed on the intake air passage which represents a flow rate of the inlet air supplied to the engine 1, an engine speed signal from an engine speed sensor (not shown) disposed on a crankshaft of the engine 1, and an air-fuel ratio signal from the air-fuel ratio sensor 31 disposed on the exhaust gas passage 4 at the portion upstream of the three-way reducing and oxidizing catalyst 11. The air-fuel ratio signal from the sensor 31 represents an air-fuel ratio of the exhaust gas flowing into the three-way reducing and oxidizing catalyst 11. In this specification, an air-fuel ratio of the exhaust gas at a certain point is defined by a ratio of the air and the fuel which are supplied to the engine or exhaust passages upstream of the point. Therefore, when no air or fuel is supplied in the exhaust passages upstream of the considered point, the air-fuel ratio of the exhaust gas at the point becomes the same as the operating air-fuel ratio of the engine (i.e., the air-fuel ratio of the air-fuel mixture supplied to combustion chambers of the engine).

Further, the output port of the control circuit 30 is connected to fuel injection valves (not shown) which inject a pressurized fuel to the inlet ports of the respective cylinder of the engine 1, and the flow control valve 21b, to perform the fuel injection control and the secondary air supply control.

In this embodiment, the control circuit 30 controls the air-fuel ratio of the engine to be slightly lower than the stoichiometric air-fuel ratio in such a manner that, for example, λ (an excess air ratio) falls in the range between 0.98 and 0.995.

The control circuit 30 calculates the basic fuel injection amount TAUP based on the inlet air signal and the engine speed signal. For example, the control circuit calculates the amount of inlet air supplied to the engine per one revolution of the engine (Q/N) from the amount of inlet air Q and the engine speed N, and calculates the basic fuel injection amount TAUP by a formula $TAUP=(Q/N) \times \alpha$.

The basic fuel injection amount TAUP is an amount of the fuel required to obtain the stoichiometric air-fuel ratio (i.e., $\lambda=1.0$). Further, the control circuit 30 calculates the actual fuel injection amount TAU by a formula $TAU=TAUP \times (1/\lambda_T) \times FAF$.

$\lambda_T$ is a target value of the excess air ratio, and is set at the value $\lambda_T=0.98$ to $0.995$ as explained before. FAF is a air-fuel ratio correction factor which is determined based on the air-fuel ratio signal from the air-fuel ratio sensor 31.

In this embodiment, a linear air-fuel ratio sensor which outputs a signal corresponding to the air-fuel ratio of the exhaust gas in a wide air-fuel ratio range is used for the air-fuel ratio sensor 31. The control circuit 30 calculates an actual excess air ratio $\lambda$ of the exhaust gas based on the air-fuel ratio signal from the air-fuel ratio sensor 31, and determines the value of the correction factor FAF by a feedback control based on the values of $\lambda$ and $\lambda_T$, in such a manner that $\lambda$ becomes equal to $\lambda_T$. By this air-fuel ratio control, the air-fuel ratio (the excess air ratio) of the engine is precisely controlled at the target value.

The value of the correction factor FAF is determined by, for example, PID (proportional, integral and derivative) process based on the amount of the deviation of $\lambda$ from the target value $\lambda_T$, or other known type feedback control. Further, in order to assure that all of $NO_x$ from the engine is converted to $N_2$ and $NH_3$, it is necessary to maintain the air-fuel ratio of the exhaust gas lower than the stoichiometric air-fuel ratio. Therefore, it is preferable to set a lower limit value for the FAF to prevent the air-fuel ratio of exhaust gas from becoming higher than the stoichiometric air-fuel ratio.

Figure 2:
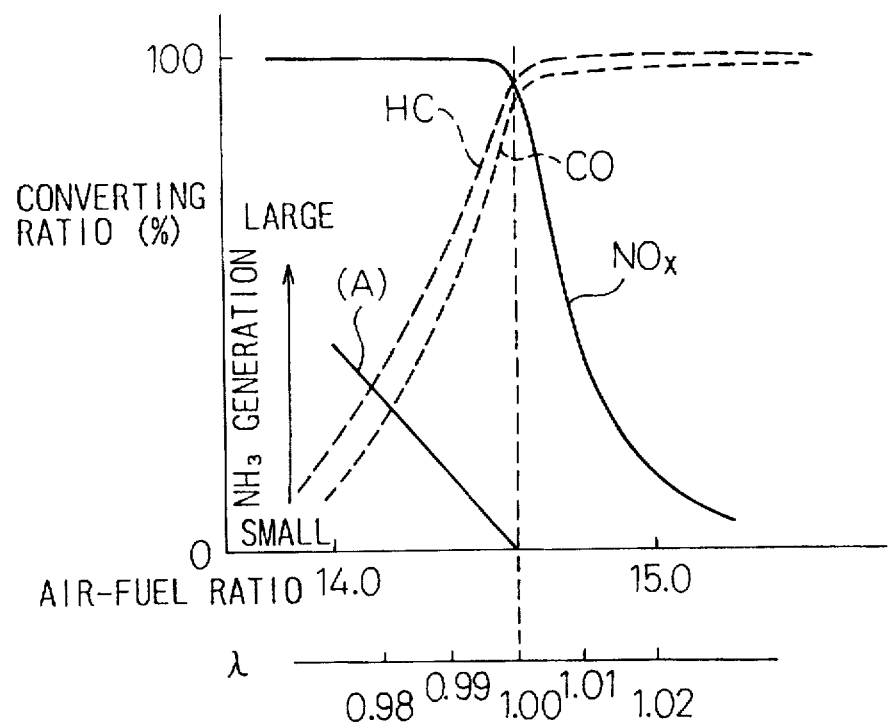
FIG. 2 is a graph showing typical changes in conversion rates of HC, CO and $NO_x$ of a three-way reducing and oxidizing catalyst in accordance with a change in the air-fuel ratio of the exhaust gas.

The three-way reducing and oxidizing catalyst 11 uses, for example, a honeycomb type substrate made of cordierite, and an alumina layer which acts as a carrier for the catalyst is coated on the surface of the substrate. On this carrier, precious metals such as platinum Pt, rhodium Rh, and palladium Pd are carried. FIG. 2 shows changes in conversion rates of HC, CO and $NO_x$ of the three-way reducing and oxidizing catalyst 11 in accordance with the change in the air-fuel ratio of the exhaust gas. As shown in FIG. 2, the three-way reducing and oxidizing catalyst converts HC, CO, $NO_x$ in the exhaust gas at high efficiency when the air-fuel ratio of exhaust gas is the stoichiometric air-fuel ratio (i.e., $\lambda=1.0$). The conversion rates of HC and CO become higher than that of stoichiometric air-fuel ratio when the air-fuel ratio becomes lean ($\lambda>1.0$). Conversely, the conversion rate of $No_x$ becomes higher than that of stoichiometric air-fuel ratio when the air-fuel ratio becomes rich ($\lambda<1.0$).

As stated before, most of the $NO_x$ in the exhaust gas from the engine 1 consists of NO. When $\lambda$ is smaller than 1.0 (i.e., when the air-fuel ratio of the exhaust gas is rich), most part of this NO is converted by the three-way reducing and oxidizing catalyst 11 by reducing reactions $$2CO+2NO \rightarrow N_2+2CO_2,$$

and $$2H_2+2NO \rightarrow N_2+2H_2O.$$

However, a small part of NO is converted to $NH_3$ by the reaction $$5H_2+2NO \rightarrow 2NH_3+2 H_2O.$$

The conversion rate of NO to $N_2$ becomes higher as the amount of rhodium Rh contained in the three-way reducing and oxidizing catalyst increases, and the conversion rate of NO to $NH_3$ becomes lower accordingly. As explained later, this embodiment uses an oxidizing catalyst 13 and the denitrating and oxidizing catalyst 15 disposed at the portions downstream of the three-way reducing and oxidizing catalyst for converting NO and $NH_3$ in the exhaust gas. Therefore, it is preferable to maintain the amounts of NO and $NH_3$ processed by the catalysts 13 and 15 as small as possible to increase an overall conversion rate of $NO_x$. Considering the above, the three-way reducing and oxidizing catalyst 11 in this embodiment contains a relatively large amount of rhodium Rh as the catalytic component to reduce the amount of $NH_3$ and $NO_x$ in the exhaust gas after it passes through the three-way reducing and oxidizing catalyst 11. A line (A) in FIG. 2 shows a change in the amount of $NH_3$ generated by the three-way reducing and oxidizing catalyst 11 in accordance with the change in $\lambda$ of exhaust gas. The amount of $NH_3$ increases as the air-fuel ratio becomes lower than the stoichiometric ratio. However, when the air-fuel ratio is slightly lower than the stoichiometric air-fuel ratio (i.e., when $\lambda=0.98$ to 0.995), the amount of $NH_3$ generated by the three-way reducing and oxidizing catalyst is relatively small, and all the $NO_x$ is converted to $N_2$ and a small amount of $NH_3$. Thus, the exhaust gas downstream of the three-way reducing and oxidizing catalyst 11 in this embodiment contains a small amount of $NH_3$ and does not contain $NO_x$ at all.

At the portion downstream of the three-way reducing and oxidizing catalyst 11, the exhaust gas is diverged into two branch exhaust passages 4a and 4b. In this embodiment, the flow resistances of the first and the second branch exhaust passages are selected in such a manner that the ratio of the amounts of the exhaust gases flowing into the first and the second branch exhaust passages 4a and 4b becomes a:b. The settings of the flow distribution ratio a:b is explained later. In this embodiment, by setting the flow resistances of the first and the second branch exhaust passages at a predetermined value, the exhaust gas flow downstream of the three-way reducing and oxidizing catalyst can be divided by a required ratio without complicated flow controls.

The exhaust gas flows into the first branch exhaust passage 4a, then flows into the oxidizing catalyst 13. Before it flows into the oxidizing catalyst 13, secondary air is supplied to the exhaust gas so that the air-fuel ratio of the exhaust gas is adjusted to be higher than the stoichiometric air-fuel ratio.

The oxidizing catalyst 13 uses a substrate made of cordierite similar to that of the three-way reducing and oxidizing catalyst 11, and oxidizing catalytic components such as platinum Pt, palladium Pd are carried on the alumina layer. The oxidizing catalyst 13 oxidizes the HC and CO component in the exhaust gas and converts them to $H_2O$ and $CO_2$. Further, the oxidizing catalyst 13 oxidizes the $NH_3$ component in the exhaust gas and converts it to NO, $NO_2$, and $H_2O$. By oxidizing reactions of $$2NH_3 + 7/2 O_2 \rightarrow 2NO_2 + 3H_2O,$$

and $$4NH_3 + 5O_2 \rightarrow 4NO + 6H_2O.$$

Thus, all of the $NH_3$ in the exhaust gas flowing into the first branch exhaust passage 4a is converted to $NO_x$ (in this case, NO and $NO_2$).

Figure 3:
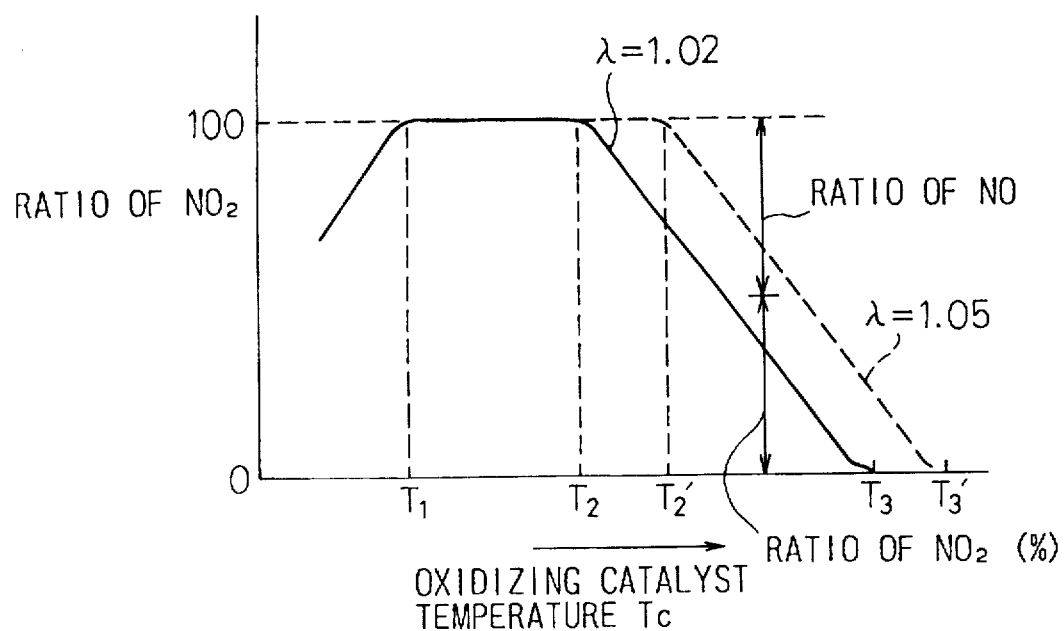
FIG. 3 is a graph showing typical changes in the rate of the amounts of $NO_2$ in the $NO_x$ generated by a oxidizing catalyst in accordance with changes in the temperature of the catalyst and the air-fuel ratio of the exhaust gas.

The ratio of the amounts of NO and $NO_2$ generated by the conversion of $NH_3$ by the oxidizing catalyst changes according to the temperature of the oxidizing catalyst 13 and the air-fuel ratio of the exhaust gas flowing into the catalyst 13. FIG. 3 shows a typical change in the ratio of the NO and the $NO_2$ in the $NO_x$ components converted from $NH_3$ by the oxidizing catalyst 13. The vertical axis in FIG. 3 represents a ratio of the amount of the $NO_2$ component in the total amount of $NO_x$ converted by the oxidation of $NH_3$ and the horizontal axis represents the temperature of the oxidizing catalyst 13. Further, the solid line in FIG. 3 represents the ratio of $NO_2$ component in the total amount of $NO_x$ when the air-fuel ratio of the exhaust gas flowing into the catalyst 13 corresponds to $\lambda=1.02$, and the dotted line represents the ratio of $NO_2$ component in the total amount of $NO_x$ when the air-fuel ratio corresponds to $\lambda=1.05$.

As shown in FIG. 3, when the temperature $T_c$ of the oxidizing catalyst 13 is low (for example, $T_c < T_1$), both NO and $NO_2$ components are produced by the oxidation of $NH_3$, and the ratio of $NO_2$ in the produced $NO_x$ increases as the temperature $T_c$ becomes higher. When the temperature $T_c$ is in a medium region (for example, $T_1 < T_c < T_2$ in case of $\lambda=1.02$), the ratio of $NO_2$ becomes 100%, i.e., only $NO_2$ is produced. The ratio of NO in the $NO_x$ generated by the oxidation of $NH_3$ is the value obtained by subtracting the ratio of $NO_2$ from 100%. On the other hand, when the temperature $T_c$ becomes higher, the ratio of $NO_2$ decreases as the temperature $T_c$ increases, and in the high temperature region of $T_c$ (for example, $T_c > T_3$ in case of $\lambda=1.02$), the ratio of $NO_2$ becomes 0, i.e., when the temperature $T_c$ is in the high temperature region, all of $NH_3$ flowing into the oxidizing catalyst 13 is converted to NO. The temperatures $T_1$, $T_2$, and $T_3$ vary according to the type of the oxidizing catalyst. However in general, $T_2$ is between 100° C. and 200° C., and $T_3$ is between 350° C. and 400° C.

Further, even if the temperature is the same, the ratio of NO and $NO_2$ in the $NO_x$ changes according to the air-fuel ratio of the exhaust gas flowing into the oxidizing catalyst 13. When the air-fuel ratio is higher, the ratio of $NO_2$ becomes higher in the high temperature region of $T_c$. For example, when $\lambda=1.05$, the ratio of $NO_2$ becomes higher than that when $\lambda=1.02$ in the range $T_c > T_3$, as shown by the dotted line in FIG. 3. On the other hand, in the medium and low temperature ranges, the ratio of $NO_2$ is determined only by the temperature $T_c$ regardless of the air-fuel ratio.

The reason why the ratio of $NO_2$ becomes higher as the air-fuel ratio becomes higher in the high temperature region of $T_c$, is that the conversion ratios of NO and $NO_2$ from $NH_3$ are determined by a chemical equilibrium in the high temperature region because the reaction proceeds rapidly in the high temperature region. Therefore, when the concentration of $O_2$ in the exhaust gas becomes higher (i.e., when the air-fuel ratio of exhaust gas becomes higher), a larger amount of $NO_2$ is produced by the oxidation of $NH_3$. On the other hand, since the speeds of the chemical reactions are low in the low temperature region, the conversion ratios of NO and $NO_2$ from $NH_3$ are determined by the speeds of chemical reactions and the concentration of the $O_2$ in the exhaust gas becomes less effective. Therefore the conversion rates are determined by the temperature TC in the low temperature region regardless of the air-fuel ratio of the exhaust gas.

In order to convert all $NH_3$ component in the exhaust gas flowing into the oxidizing catalyst 13 to $NO_x$, such as NO and $NO_2$, it is necessary to maintain the air-fuel ratio of the exhaust gas higher than stoichiometric air-fuel ratio as much as possible. Further, in order to convert the HC, CO components in the exhaust gas to $H_2O$, $CO_2$ by the denitrating and oxidizing catalyst 15 on the exhaust gas outlet passage 5, it is necessary to maintain the air-fuel ratio of the mixture of the exhaust gases from the first and the second branch exhaust passages 4a, 4b higher than the stoichiometric air-fuel ratio. Therefore, it is preferable to set the amount of secondary air to the branch exhaust passage 4a as large as possible. However, if the excessive secondary air is supplied to the branch exhaust passage 4a, the oxidizing catalyst 13 is cooled by the secondary air and the oxidation reaction of $NH_3$ in the catalyst 13 becomes lower. Therefore, the amount of the secondary air supplied from the unit 21 in this embodiment is adjusted in such a manner that the excess air ratio of the exhaust gas flowing into the oxidizing catalyst 13 is around $\lambda=1.05$. Namely, the excess air ratio $\lambda$ of the exhaust gas flowing into the oxidizing catalyst in this embodiment is adjusted to be relatively high, and the conversion ratio from $NH_3$ to $NO_2$ are relatively high even in the high temperature region (refer to FIG. 3.)

The control circuit 30 calculates the amount of secondary air required for maintaining the excess air ratio $\lambda$ of the exhaust gas flowing into the oxidizing catalyst 13 at 1.05 based on the inlet air amount Q and the target excess air ratio $\lambda_T$ of the air-fuel ratio control. Further, the control circuit 30 controls the flow control valve 21b so that the calculated amount of the secondary air is injected from the nozzle 21a. Thus, the excess air ratio $\lambda$ of the exhaust gas flowing into the oxidizing catalyst 13 is maintained at $\lambda=1.05$ regardless of the engine operating conditions.

Further, if an air-fuel ratio sensor similar to the sensor 31 is disposed on the first branch exhaust passage 4a downstream of the oxidizing catalyst 13, the amount of the secondary air can be feedback controlled by the air-fuel ratio of the exhaust gas flowing through the oxidizing catalyst 13. In this case, a precise control of the air-fuel ratio of exhaust gas flowing into the oxidizing catalyst 13 and the ratio of NO and $NO_2$ downstream of the oxidizing catalyst 13 can be achieved.

As explained above, all of the $NH_3$ component in the exhaust gas flowing into the first branch exhaust passage 4a is converted to $NO_x$ components by the oxidizing catalyst 13.

On the other hand, the exhaust gas flowing into the second branch exhaust passage 4b passes through the resistance body 17 and flows into the exhaust gas outlet passage 5 without any change in its composition. Therefore, after the exhaust gases from the first and the second branch exhaust passage mix with each other in the exhaust gas outlet passage 5, the mixture contains b/(a+b) of the total amount of the $NH_3$ produced by the three-way reducing and oxidizing catalyst 11, i.e., the amount of the $NH_3$ in the exhaust gas outlet passage 5 is determined by the flow distribution ratio a:b between the first and the second branch exhaust passages.

Further, since the amount (moles) of the $NO_x$ produced by the oxidizing catalyst 13 is the same as the amount (moles) of the $NH_3$ converted by the oxidizing catalyst 13, the exhaust gas flowing into the exhaust gas outlet passage 5 from the first branch exhaust passage 4a contains $NO_x$ corresponding to a/(a+b) of the total amount of the $NH_3$ produced by the three-way reducing and oxidizing catalyst 11. Therefore, the ratio of the amounts (moles) of $NO_x$ and $NH_3$ in the exhaust gas mixture in the exhaust gas outlet passage 5 becomes a:b, i.e., same as the flow distribution ratio between the first and the second branch exhaust passages.

The excess air ratio of the exhaust gas flowing into the exhaust gas outlet passage 5 from the first branch exhaust passage 4a is maintained at $\lambda=1.05$, and this exhaust gas mixes with the exhaust gas from the second branch exhaust passage 4b which has the excess air ratio of $\lambda=0.98$ to 0.995. Therefore, the excess air ratio of the mixture of the exhaust gas in the exhaust gas outlet passage 5 becomes lean (for example, $\lambda=1.01$ to 1.02). Thus, an exhaust gas of lean air-fuel ratio containing $NO_x$ and $NH_3$ of a:b in molar ratio flows into the denitrating and oxidizing catalyst 15.

The denitrating and oxidizing catalyst 15 uses a substrate made of cordierite similar to that of the three-way reducing and oxidizing catalyst 11, and catalytic components such as vanadium oxide $V_2O_5$, and titania $TiO_2$ is carried on the alumina layer. The denitrating and oxidizing catalyst 15 oxidizes HC, CO component by the oxidizing reactions

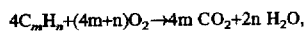

and

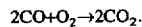

Further, the denitrating and oxidizing catalyst oxidizes $NH_3$ component by the denitrating reactions

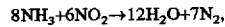

and

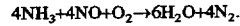

In order to convert all the $NH_3$ and $NO_x$ components in the exhaust gas by the above denitrating reactions, the molar ratio of the $NH_3$ and $NO_x$ (NO and $NO_2$) must be strictly maintained at a stoichiometric molar ratio. In this embodiment, the molar ratio of $NO_x$ and $NH_3$ in the exhaust gas flowing into the denitrating and oxidizing catalyst 15 is maintained at a:b. However, the molar ratio of NO and $NO_2$ in the total amount of $NO_x$ is changes according to the temperature $T_c$ of the oxidizing catalyst 13 and the air-fuel ratio of exhaust gas flowing into the oxidizing catalyst 13. Though the air-fuel ratio of the exhaust gas is kept at constant (i.e., at $\lambda=1.05$) at the inlet of oxidizing catalyst 13 in this embodiment, the temperature $T_c$ changes according to the exhaust gas temperature. Therefore, if the flow distribution ratio a:b is set at a fixed value, it is difficult to maintain the molar ratio of $NO_x$ and $NH_3$ in the exhaust gas outlet passage 5 stoichiometrical, and surplus $NO_x$ or $NH_3$ is produced by the denitrating and oxidizing catalyst 15.

For example, when the temperature $T_c$ of the oxidizing catalyst 13 is high, all the $NH_3$ component in the exhaust gas flowing into the first branch exhaust passage 4a is converted to NO by the oxidizing catalyst 13. In this case, since one mole of NO and one mole of $NH_3$ are stoichiometrical to produce $N_2$ and $H_2O$, the flow distribution ratio a:b (i.e., in this case, molar ratio of NO and $NH_3$) must be set 1:1. On the other hand, when the temperature $T_c$ is in the medium region (for example, $T_1<T_c<T_2$' in FIG. 3), all the $NH_3$ component in the exhaust gas flowing into the first branch exhaust passage 4a is converted to $NO_2$ by the oxidizing catalyst 13. Since one mole of $NO_2$ and ¾ mole of $NH_3$ are stoichiometrical to produce $N_2$ and $H_2O$, it is necessary to set the flow distribution ratio of the first and the second branch exhaust passage a:b (i.e., molar ratio of $NO_2$ and $NH_3$) at 3:4 in this case.

However, when the engine operating conditions are constant, the exhaust gas temperature and the temperature $T_c$ of the oxidizing catalyst 13 becomes also constant. In such a case, the ratio of NO and $NO_2$ produced by the oxidizing catalyst 13 becomes also constant, and the flow distribution ratio a:b may be set at a fixed value. Therefore, first, the embodiments in which the flow distribution ratio a:b can be set at a fixed value are explained.

As a first example, the case in which the engine 1 is operated on a relatively low load conditions in the most of operations is considered. In this case, the temperature $T_c$ of the oxidizing catalyst 13 is always medium, i.e., between $T_1$ and $T_2'$ in FIG. 3. When the temperature $T_c$ is between $T_1$ and $T_2'$, all the $NH_3$ component is converted to $NO_2$ by the oxidizing catalyst 13. Therefore, the flow distribution of the first and the second branch exhaust passage is set at a fixed value of 3:4. Namely, in this case, 3/7 of the exhaust gas flows through the three-way reducing and oxidizing catalyst 11 flows into the first branch exhaust passage 4a and 4/7 of the exhaust gas flows into the second branch exhaust passage 4b. Since the $NH_3$ in the exhaust gas flows into the first branch exhaust passage is converted to equimolar amount of $NO_2$, the molar ratio of $NO_2$ and $NH_3$ in the exhaust gas mixture in the exhaust gas outlet passage 5 becomes precisely 3:4, i.e., the stoichiometric molar ratio to produce $N_2$ and $H_2O$. Therefore, the $NO_2$ and the $NH_3$ in the exhaust gas mixture react each other in the denitrating and oxidizing catalyst 15 and are converted to $N_2$ and $H_2O$ without producing any surplus $NO_2$ and $NH_3$. Also, since the air-fuel ratio of exhaust gas mixture flowing into the denitrating and oxidizing catalyst 15 is maintained higher than the stoichiometric air-fuel ratio, HC and CO components in the exhaust gas mixture are oxidized by the denitrating and oxidizing catalyst 15 and converted to $H_2O$ and $CO_2$. Therefore, the exhaust gas downstream of the denitrating and oxidizing catalyst 15 is substantially free from HC, CO, $NO_x$ or $NH_3$ components.

Figure 4:
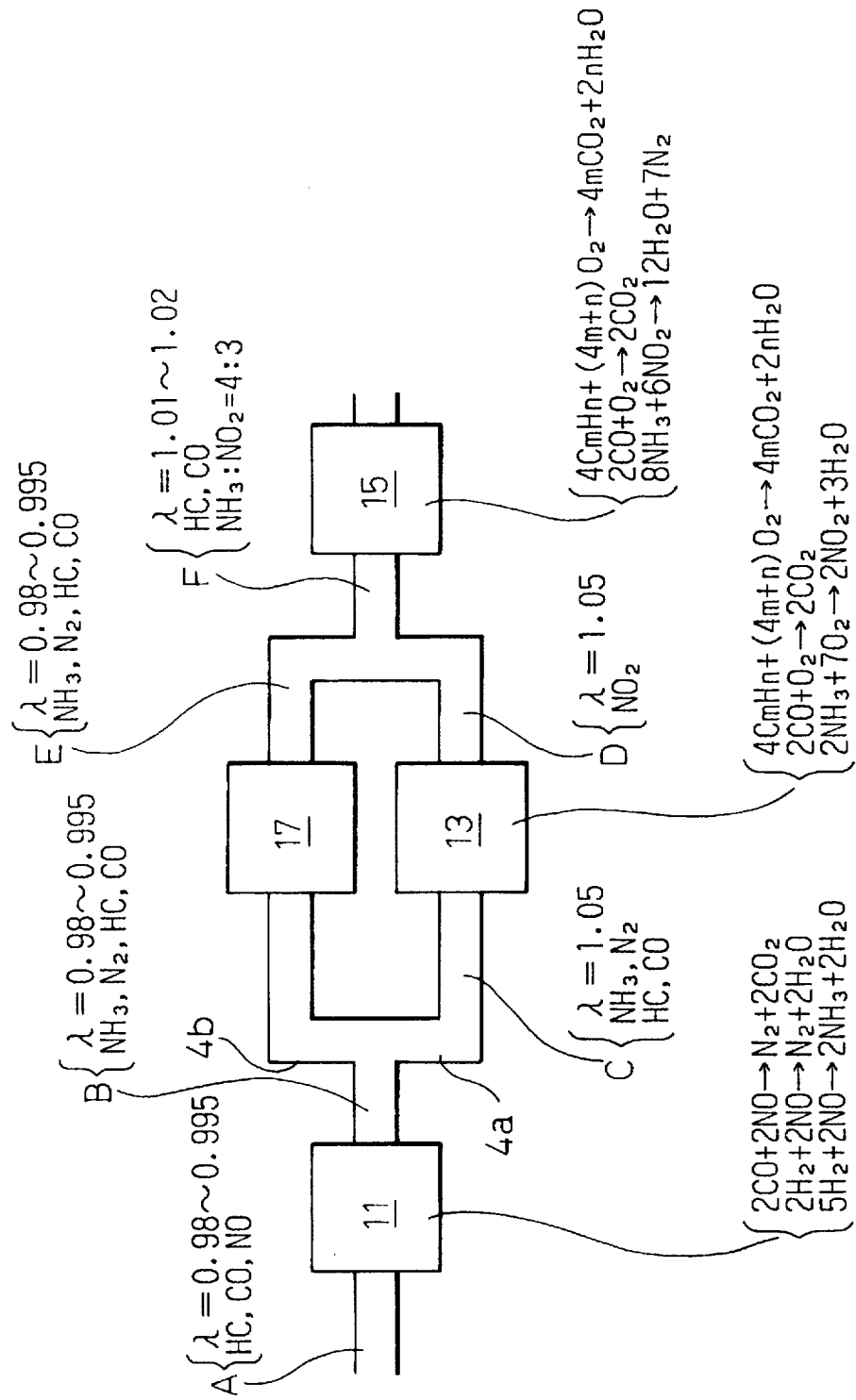
FIG. 4 is a schematic drawing showing an example of the performance of the exhaust gas purification device according to the embodiment in FIG. 1.

FIG. 4 is a simplified schematic drawing for explaining the operation of the above embodiment. In FIG. 4, the same reference numerals as those in FIG. 1 designate the same elements. In FIG. 4, the exhaust gas discharged from the engine 1 has an excess air ratio of $\lambda$=0.98 to 0.995, and contains HC, CO and $NO_x$ (NO) in relatively large amounts (FIG. 4, portion A). After passing through the three-way reducing and oxidizing catalyst, most of HC and CO components are removed from the exhaust gas, and all the $NO_x$ components are converted to $N_2$ and $NH_3$ (FIG. 4, portion B). Downstream of the three-way reducing and oxidizing catalyst 11, the exhaust gas diverges into the first and the second branch exhaust passage at the flow distribution ratio of 3:4. Then the secondary air is supplied to the exhaust gas in the first branch exhaust passage 4a, and the excess air ratio of the exhaust gas becomes $\lambda$=1.05 (FIG. 4, portion C). Then the exhaust gas flows through the oxidizing catalyst 13 where $NH_3$ in the exhaust gas is oxidized and converted to $NO_2$ (FIG. 4, portion D). On the other hand, the composition of the exhaust gas flowing through the second branch exhaust passage 4b is not changed (FIG. 4, portion E). Therefore, when the exhaust gases from the first and the second branch exhaust passages mix with each other in the exhaust gas outlet passage 5, the molar ratio of $NO_2$ and $NH_3$ in the exhaust gas mixture becomes 3:4, i.e., exactly the stoichiometric molar ratio, and the excess air ratio of the mixture becomes $\lambda$=1.01 to 1.02 (FIG. 4, portion F). This exhaust gas mixture flows into the denitrating and oxidizing catalyst 15 where $NO_2$ and $NH_3$ reacts each other to produce $N_2$ and $H_2O$ without any surplus $NO_2$ and $NH_3$. Thus the exhaust gas downstream of the denitrating and oxidizing catalyst practically does not contain any HC, CO, $NO_x$ or $NH_3$ components.

Now, the reason why the resistance body 17 is disposed on the second branch exhaust passage 4b is explained. The resistance body 17 consists of a dummy catalyst which uses a honeycomb type substrate the same as that of the oxidizing catalyst 13 on the first branch exhaust passage 4a, but no catalyst is attached thereon. The resistance body 17 is used for generating approximately the same flow resistance as that of the oxidizing catalyst 13. If only the flow distribution ratio is to be set to a predetermined value, it may be sufficient to adjust the cross sectional areas of the branch exhaust passages 4a and 4b, and it is not necessary to dispose the resistance body 17 on the second branch exhaust passage 4b. However, in the actual operations of the engine 1, pulsation of the exhaust gas occurs and, due to this pulsation, a recirculating flow of the exhaust gas as shown by an arrow R in FIG. 1 occurs between the branch exhaust passages 4a and 4b if the characteristics of the flow resistances in the passages 4a and 4b are not the same. If the recirculation flow R occurs, the molar ratio of $NO_2$ and $NH_3$ in the exhaust gas mixture flowing into the denitrating and oxidizing catalyst 15 can not be maintained at the stoichiometric molar ratio.

Namely, if the resistance body 17 is not provided on the second branch exhaust passage 4b, the pulsation of the exhaust gas in the second branch exhaust passage 4a reaches the merging point of passage 4a and 4b without attenuation, while the pulsation of exhaust gas in the first branch exhaust passage 4a is attenuated by the oxidizing catalyst 13. Further, the phase of the pulsation reaching the merging point through the first branch exhaust passage 4a becomes different from the phase of the pulsation reaching the merging point through the second branch exhaust passage 4b due to the existence of the oxidizing catalyst 13, and the recirculation flow R occurs near the merging point due to the differences in the phases and the intensities of the pulsation. However, in this embodiment, since the resistance body 17 is provided on the second branch exhaust passage 4b, the characteristics of the flow resistance of the second branch exhaust passage 4b becomes substantially the same as that of the first branch exhaust passage 4a, i.e., the phases and the intensities of the pulsation of the exhaust gases reaching the merging point become substantially the same. Therefore, a recirculating flow does not occur in this embodiment.

Since the purpose for providing the resistance body 17 is to maintain the attenuation and the phase of the pulsation of the exhaust gas flows through the second branch exhaust passage 4b as the same as those of the exhaust gas flows through the first branch exhaust passage 4a, it is not necessary to adjust the flow resistance of the resistance body 17 to be exactly the same as that of the oxidizing catalyst 13. Therefore, the resistance body 17 may have approximately the same resistance as the oxidizing catalyst 13.

Figure 5:
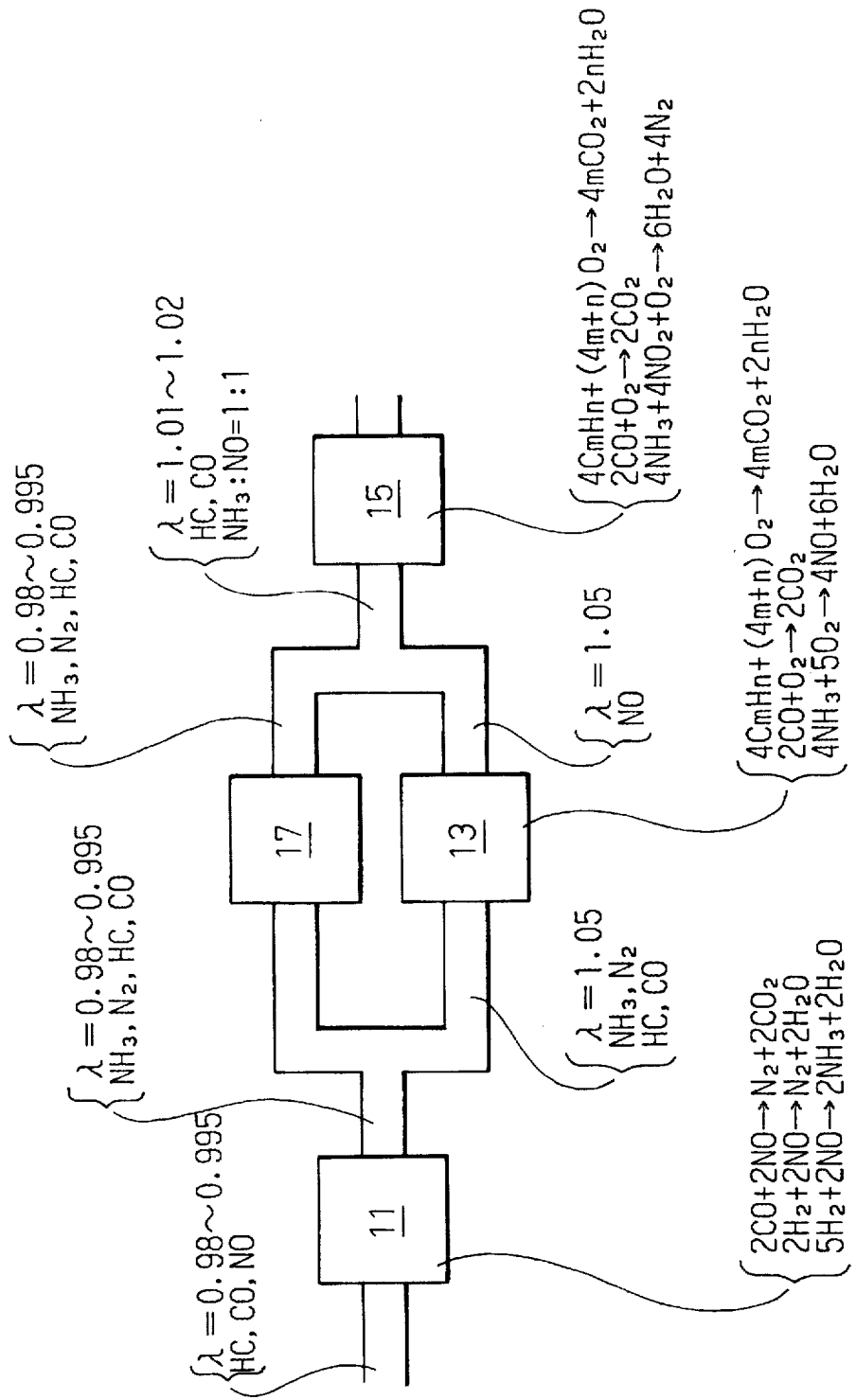
FIG. 5 is a schematic drawing showing another example of the performance of the exhaust gas purification device according to the embodiment in FIG. 1.

Next, the case in which the engine 1 is operated on high load conditions in the most operation is considered. In this case, the temperature $T_c$ of the oxidizing catalyst 13 becomes high (for example, higher than $T_3'$ in FIG. 3). In this case, all the $NH_3$ component in the exhaust gas is converted to NO by the oxidizing catalyst 13. Therefore, the flow distribution ratio a:b is set at 1:1, and ½ of the exhaust gas from the three-way reducing and oxidizing catalyst 11 flows into the first branch exhaust passage 4a where the $NH_3$ in the exhaust gas is converted to equimolar amount of NO. Namely, ½ of the $NH_3$ produced by the three-way reducing and oxidizing catalyst 11 is converted to equimolar amount of NO. Thus, the molar ratio of NO and $NH_3$ in the exhaust gas mixture in the exhaust gas outlet passage 5 becomes exactly 1:1. FIG. 5 is a similar schematic drawing which shows the compositions of the exhaust gas in this case. As seen from FIG. 5, the exhaust gas downstream of the denitrating and oxidizing catalyst is also substantially free from HC, CO, $NO_x$ or $NH_3$ in this case.

Next, another embodiment of the present invention is explained. In the embodiment in FIG. 1, the flow distribution ratio a:b of the first and the second branch exhaust passage is set at a fixed value. As explained before, the ratio of NO and $NO_2$ generated by the oxidizing catalyst 13 varies as the temperature $T_c$ of the oxidizing catalyst 13 and the excess air ratio $\lambda$ of the exhaust gas change. Therefore, if the flow distribution ratio a:b is fixed, it is difficult to keep the ratio of the amounts of $NH_3$ and $NO_2$ at stoichiometric ratio when the operating condition of the engine changes. In the embodiment explained below, the flow distribution ratio a:b is changed according to the temperature $T_c$ of the oxidizing catalyst 13 and the excess air ratio of the exhaust gas so that the ratio of $NH_3$ and $NO_x$ in the exhaust gas flowing into the denitrating and oxidizing catalyst 15 is maintained at the stoichiometrical ratio.

Figure 6:
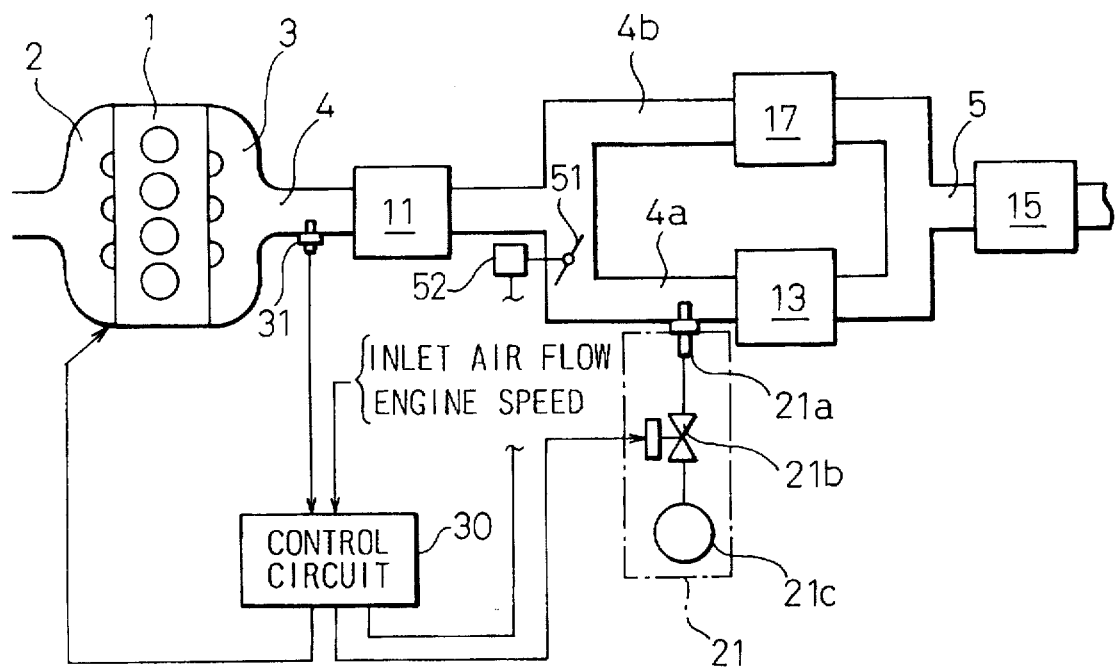
FIG. 6 is a drawing schematically illustrating an embodiment of the present invention.

FIG. 6 is a schematic drawing similar to FIG. 1 which illustrates the present embodiment. However, this embodiment is different from the embodiment in FIG. 1 in that the flow distribution ratio of the first and the second branch exhaust passages 4a and 4b is set at the fixed value of 1:1, and a variable throttle valve 51 is provided at the inlet of the first branch exhaust passage 4a. The variable throttle valve 51 is actuated by an actuator 52 of an appropriate type, such as a vacuum actuator or a stepper motor, which adjusts the flow distribution ratio of the first and the second branch exhaust passages 4a and 4b by throttling the exhaust gas flowing into the first branch exhaust passage 4a. In this embodiment, the variable throttle valve 51 is capable of adjusting the flow distribution ratio a:b from 3:4 (when the variable throttle valve 51 fully closes) to 1:1 (when the variable throttle valve 51 fully opens).

In this embodiment, the flow distribution ratio a:b (i.e., the degree opening of the variable throttle valve 51) is determined on the following basis.

Assuming that N moles of $NH_3$ is produced by the three-way reducing and oxidizing catalyst 11, the amount of $NH_3$ in the exhaust gas flowing into and oxidized by the oxidizing catalyst 13 on the second branch exhaust passage 4a becomes $N \times a/(a+b)$ moles when the flow distribution ratio is a:b. In the oxidizing catalyst 13, one mole of $NO_2$ or NO is produced by the oxidation reactions $$2NH_3 + 7/2 O_2 \rightarrow 2NO_2 + 3H_2O,$$

and $$4NH_3 + 5O_2 \rightarrow 4NO + 6H_2O.$$

Therefore, the total $N \times a/(a+b)$ moles of $NO_2$ and NO are produced from $N \times a/(a+b)$ moles of $NH_3$ by the oxidizing catalyst 13 on the branch exhaust passage 4a. Further, assuming that the ratio of $NO_2$ in the total $NO_x$ is X, the moles of the $NO_2$ and NO produced by the oxidizing catalyst 13 become:

$$X \times N \times a/(a+b) \ [NO_2],$$

and $$(1-X) \times N \times a/(a+b) \ [NO].$$

The moles of $NH_3$ reacting with these $NO_2$ and NO to stoichiometrically produce $N_2$ and $H_2O$ are,

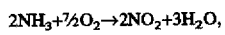

and

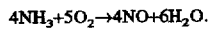

respectively.

Therefore, the total moles of $NH_3$ required is, $$\{(4X/3)+(1-X)\} \times N \times a/(a+b) = (1+X/3) \times N \times a/(a+b).$$

In order to supply this amount of $NH_3$ through the second branch exhaust passage 4b, the exhaust gas flowing into the second branch exhaust passage 4b must contain the $(1+X/3) \times N \times a/(a+b)$ moles of $NH_3$. Since the flow distribution ratio of the first and the second branch exhaust passages 4a and 4b is a:b, $N \times b/(a+b)$ moles of the $NH_3$ produced by the three-way reducing and oxidizing catalyst 11 flows into the second branch exhaust passage 4b. Therefore, $(1+X/3) \times N \times a/(a+b)$ must be equal to $N \times b/(a+b)$.

Thus, $(1+X/3) \times N \times a/(a+b) = N \times b/(a+b)$.

In order to satisfy this relationships, b must be equal to $(1+X/3) \times a$, i.e., $b=(1+X/3) \times a$.

This means that when the ratio of $NO_2$ in the $NO_x$ produced by the oxidizing catalyst 13 is X, all $NH_3$ and $NO_2$ are converted to $N_2$ and $H_2O$ by the denitrating and oxidizing catalyst 15 without any surplus $NH_3$ and $NO_2$, only if the flow distribution ratio a:b is $1:(1+X/3)$.

In this embodiment, the control circuit 30 detects the temperature $T_c$ of the oxidizing catalyst 13, and further calculates the excess air ratio $\lambda$ of the exhaust gas flowing into the oxidizing catalyst 13 based on the amount of the air supplied to the first branch exhaust passage 4a from the secondary air supply unit 21. Then, the control circuit 30 determines the ratio X of $NO_2$ in the $NO_x$ produced by the oxidizing catalyst 13 from FIG. 3. After determining the ratio X, the control circuit 30 controls the variable throttle valve 51 in such a manner that the flow resistance of the first branch exhaust passage 4a becomes $(1+X/3)$ times of the flow resistance of the second branch exhaust passage 4b. In this embodiment, the relationships between the degree of opening of the variable throttle valve 51 and the flow resistance of the first branch exhaust passage 4a is previously obtained, for example, by experiment and stored in the ROM of the control circuit 30. Since the flow resistance of the second branch exhaust passage 4b is constant, the required value of the degree of opening of the variable throttle valve 51 to achieve the flow distribution ratio of $1:(1+X/3)$ is easily obtained using this relationships.

After the required degree of opening of the variable throttle valve 51 is obtained, the control circuit 30 controls the actuator 52 so that the variable throttle valve 51 is adjusted to the required degree of opening. Thus, according to this embodiment, $NH_3$ and $NO_x$ react with each other in the denitrating and oxidizing catalyst 15 without producing any surplus $NH_3$ and $NO_x$, and are converted to $N_2$ and $H_2O$ even when the temperature $T_c$ of the oxidizing catalyst 13 and the excess air ratio $\lambda$ of the exhaust gas flowing into the oxidizing catalyst 13 change.

The temperature $T_c$ of the oxidizing catalyst 13 may be detected directly by disposing a temperature sensor in the substrate of the oxidizing catalyst 13. However, since the temperature $T_c$ of the catalyst 13 changes according to the exhaust gas temperature, the temperature $T_c$ may be detected indirectly from the exhaust gas temperature. In this case, the relationships between the exhaust gas temperature and the temperature $T_c$ of the catalyst 13 is previously obtained, for example, by experiment, and the $T_c$ is determined from the exhaust gas temperature based on this relationships. Further, the exhaust gas temperature is determined by the load conditions of the engine. Therefore, the exhaust gas temperature may be determined indirectly from the engine load conditions. In this case, the relationships between the engine load (such as the amount of inlet air per one revolution of the engine and the engine speed) and the exhaust gas temperature is previously obtained, for example, by experiment and stored in the ROM of the control circuit 30.

Figure 7:
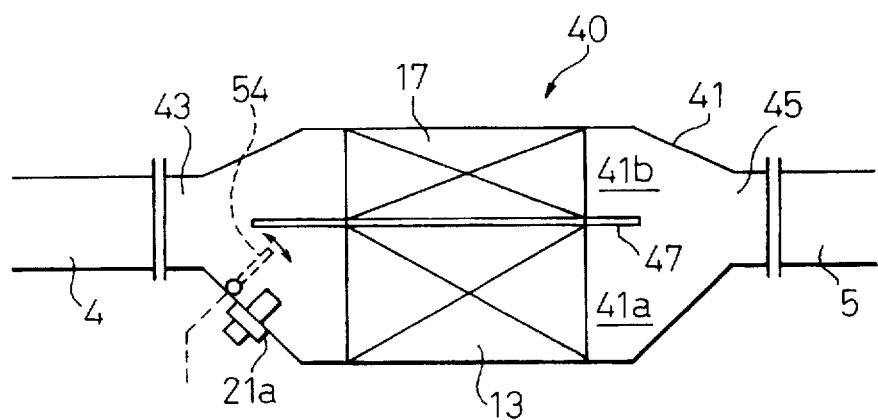
FIG. 7 is a drawing schematically illustrating an embodiment of the present invention.

FIG. 7 shows a compound type converter which may be used for accommodating the oxidizing catalyst 13 and the resistance body 17 in the embodiments illustrated by FIGS. 1 and 6. In the embodiments in FIGS. 1 and 6, two branch exhaust passages 4a and 4b are required to accommodate the oxidizing catalyst 13 and the resistance body 17, respectively. However, this arrangement is rather complicated and requires relatively large space for installation. The compound type converter in FIG. 7 provides more simple and compact arrangement for achieving the same functions as the arrangements in FIGS. 1 and 6.

In FIG. 7, the compound type converter 40 comprises a housing 41. The housing 41 is provided with an exhaust gas inlet 43 which is connected to the exhaust gas passage 4, and an exhaust gas outlet which is connected to the exhaust gas outlet passage 5. In the housing 41, a partitioning plate 47 is disposed. The partitioning plate defines two passages 41a and 41b both connecting the exhaust gas inlet 43 and the exhaust gas outlet 45 in parallel. Namely, the exhaust gas flowing into the housing 41 from the exhaust gas inlet 43 diverges into the two flow passages 41a and 41b, and after passing through the passages 41a and 41b, the exhaust gas merges to the exhaust gas outlet passage 5. Further, the nozzle 21a of the secondary air supply unit 21 is disposed at the inlet of the exhaust gas passage 41a.

In this embodiment, the oxidizing catalyst 13 is disposed on the exhaust gas passage 41a in the housing 41, and the resistance body 17 is disposed on the exhaust gas passage 41b in the same housing 41. Further, a variable throttle valve 41 for adjusting the amount of exhaust gas flowing into the exhaust gas passage 41a can be disposed at the inlet of the exhaust gas passage 41a as shown by a dotted line in FIG. 7. By using the compound type converter 40 as shown in FIG. 7, it is not necessary to provide branch exhaust passages in the exhaust gas system, and accordingly, the arrangement of the exhaust gas system becomes simple and compact.

Next, another embodiment of the present invention is explained with reference to FIG. 8. In the embodiments explained above, the exhaust gas flow is divided into two flow passages in order to obtain the required molar ratio of $NH_3$ and $NO_2$ at the denitrating and oxidizing catalyst. Though the above embodiments are advantageous in that the required molar ratio of $NH_3$ and $NO_2$ is obtained easily and precisely by dividing the exhaust gas flow mechanically, these embodiments have disadvantages that they require the branch exhaust passages or compound type converter to divide the exhaust gas flow in a predetermined ratio. The embodiment explained below provides an arrangement in which the required molar ratio of $NH_3$ and $NO_2$ at the denitrating and oxidizing catalyst is obtained without dividing the exhaust gas flow.

Figure 8:
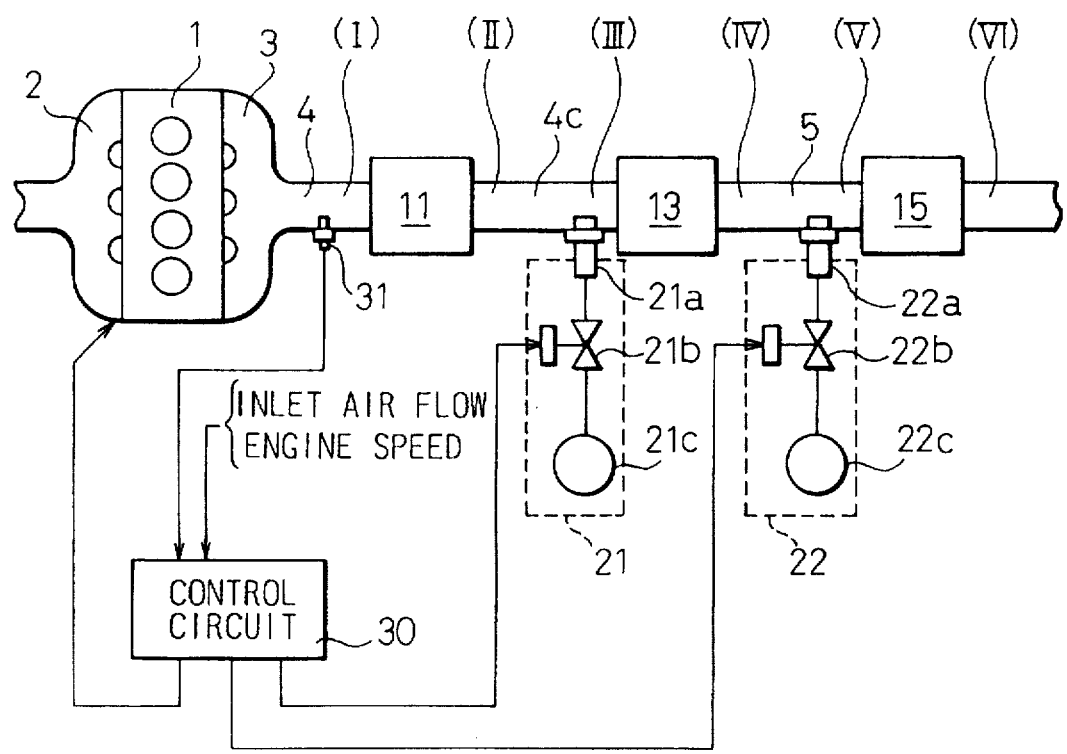
FIG. 8 is a drawing schematically illustrating an embodiment of the present invention.

FIG. 8 shows a schematic drawing which illustrates the present embodiment. In FIG. 8, the same reference numerals as those in FIG. 1 designate elements similar to those in FIG. 1.

As shown in FIG. 8, branch exhaust passages are not provided on the exhaust gas system, i.e., the three-way reducing and oxidizing catalyst 11, oxidizing catalyst 13 and denitrating and oxidizing catalyst 15 are connected in series in this order, and the air injection nozzle 21a of the secondary air supply unit 21 is disposed on an exhaust gas passage 4c which connects the three-way reducing and oxidizing catalyst 11 and the oxidizing catalyst 13. Further, another air supply unit 22 which injects air to the exhaust gas outlet passage 5 connecting the oxidizing catalyst 13 and the denitrating and oxidizing catalyst 15 is provided in this embodiment. The air supply unit 22 has a similar construction as the secondary air supply unit 21 and includes a pressurized air source 22c, a flow control valve 22b actuated by a control signal from the control circuit 30 and an air injection nozzle 22a disposed on the exhaust gas outlet passage 5.

In this embodiment, the three-way reducing and oxidizing catalyst 11 also contains a relatively large amount of rhodium Rh as a catalytic component and converts most of NO component in the exhaust gas from the engine 1 to an $N_2$ component. Further, the three-way reducing and oxidizing catalyst 11 converts the remaining small amount of NO component in the exhaust gas to an $NH_3$ component. Since all the exhaust gas from the three-way reducing and oxidizing catalyst 11 flows into the oxidizing catalyst 13 in this embodiment, the molar ratio of $NH_3$ and $NO_x$ downstream of the catalyst 13 is controlled by adjusting the conversion ratio of $NH_3$ to $NO_x$ in the oxidizing catalyst 13.

As explained before, the oxidizing catalyst 13 converts $NH_3$ to $NO_2$ and NO by the oxidation reaction

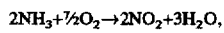

and

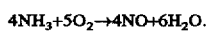

Therefore, if the amount of $O_2$ in the exhaust gas is not sufficient to oxidize all the $NH_3$ in the exhaust gas, a part of $NH_3$ in the exhaust gas passes through the oxidizing catalyst 13 without being oxidized. Further, the ratio of the amount of $NH_3$ passing through the catalyst 13 to the amount of $NH_3$ flowing into the catalyst 13 (i.e., conversion rate of $NH_3$) is determined by the excess air ratio $\lambda$ of the exhaust gas flowing into the catalyst 13. Therefore the ratio of $NH_3$ and $NO_2$ in the exhaust gas downstream of the oxidizing catalyst 13 can be controlled by changing the excess air ratio $\lambda$ of the exhaust gas flowing into the oxidizing catalyst 13.

Also, the ratio of $NO_2$ and NO in the $NO_x$ produced by the oxidizing catalyst 13 is determined by the temperature $T_c$ of the oxidizing catalyst 13 as explained in FIG. 3. Therefore, by adjusting the excess air ratio $\lambda$ of the exhaust gas flowing into the oxidizing catalyst 13 in accordance with the temperature $T_c$ of the oxidizing catalyst 13, the amounts of $NH_3$ passing through the catalyst 13 and $NO_x$ produced by the catalyst 13 ($NO_2$ and NO) can be adjusted in such a manner that the amounts of $NH_3$ and $NO_x$ are stoichiometrical to produce $N_2$ and $H_2O$.

In this embodiment, the control circuit 30 adjusts the amount of the secondary air supplied from the unit 21 in accordance with the temperature $T_c$ of the oxidizing catalyst 13 and adjusts the ratio a:b of the amount of $NH_3$ passes through the catalyst 13 and the amount of $NO_x$ ($NO_2$ and NO) in the exhaust gas downstream of the catalyst 13 so that the ratio a:b becomes stoichiometric.

The excess air ratio $\lambda$ of exhaust gas required to obtain the stoichiometric molar ratio of $NH_3$ and $NO_x$ varies according to types and temperatures of oxidizing catalyst 13. Therefore, it is preferable to determine the required excess air ratio $\lambda$, for example, by experiment using the actual oxidizing catalyst under various conditions of temperature and excess air ratio of exhaust gas.

For example, when the excess air ratio $\lambda$ of the exhaust gas flowing into the catalyst 13 is 1.0 and the temperature $T_c$ of the catalyst 13 is relatively high, the oxidizing catalyst 13 in this embodiment converts a part of $NH_3$ to NO only, and the ratio of the $NH_3$ passing through the catalyst 13 and the NO produced by the catalyst 13 becomes 1:1.

For example, in FIG. 8, the exhaust gas from the engine 1 flows through the three-way reducing and oxidizing catalyst 11, and all the $NH_3$ component in the exhaust gas is converted to $N_2$ and $NH_3$ by the three-way reducing and oxidizing catalyst 11. Then, the excess air ratio $\lambda$ of the exhaust gas downstream of the catalyst is adjusted to 1.0 by the secondary air supplied from the secondary air supply unit 21, and this exhaust gas flows into the oxidizing catalyst 13 of temperature $T_c$. As explained before, the ratio of the amounts of $NH_3$ and $NO_x$ (in this case, NO) is determined by the excess air ratio $\lambda$ of the exhaust gas flowing into the oxidizing catalyst 13. This means that the amount of the secondary air supplied from the secondary air supply unit 21 must be controlled as precisely as possible. Therefore, it is preferable to dispose an air-fuel ratio sensor similar to the sensor 31 on the exhaust gas outlet passage 5 at the portion downstream of the oxidizing catalyst 13, and to feedback control the amount of the secondary air based on the output of the air-fuel ratio sensor so that the excess air ratio $\lambda$ of the exhaust gas flowing into the oxidizing catalyst 13 becomes the required value. By controlling the excess air ratio $\lambda$ of the exhaust gas flowing into the oxidizing catalyst 13, the exhaust gas downstream of the catalyst 13 contains $NH_3$ and NO, and the molar ratio of the $NH_3$ and NO becomes exactly 1:1. Before flowing into the denitrating and oxidizing catalyst 15, air is supplied to this exhaust gas from the air supply unit 22. Due to the air supplied from the unit 22, the excess air ratio $\lambda$ of the exhaust gas flowing into the denitrating and oxidizing catalyst is adjusted so that the $\lambda$ becomes larger than 1.0 (i.e., a lean air-fuel ratio). Therefore, $NH_3$ and NO in the exhaust gas react to produce $N_2$ and $H_2O$ without causing any surplus $NH_3$ and NO, and the exhaust gas downstream of the denitrating and oxidizing catalyst 15 also becomes free from HC, CO and $NO_x$ or $NH_3$ in this embodiment.

In FIG. 8, precise control of the amount of the air supplied from the air supply unit 22 is not required. It is sufficient to control the amount of air in an appropriate range in which the air-fuel ratio of the exhaust gas becomes lean and the denitrating and oxidizing catalyst is not cooled excessively. In this embodiment, the amount of the air supplied from the air supply unit 22 is controlled in such a manner that the excess air ratio $\lambda$ of the exhaust gas flowing into the denitrating and oxidizing catalyst 15 is maintained around 1.02.

As explained above, the ratio of $NO_2$ and NO in the $NO_x$ contained in the exhaust gas flowing into the denitrating and oxidizing catalyst 15 can be controlled by merely adjusting the amount of the secondary air supplied to the exhaust gas upstream of the oxidizing catalyst 13. Therefore, it becomes possible to remove HC, CO, and $NO_x$ components in the exhaust gas simultaneously without providing the branch exhaust passages in the exhaust gas system.

FIGS. 9 and 10 show the results of experiments in which the exhaust gas purification devices in the above embodiments are applied to actual internal combustion engines. FIGS. 9 and 10 corresponds to the experiments of the devices corresponding to the embodiment in FIG. 1 and the embodiment in FIG. 8, respectively. In these experiments, a 2,200 cc engine is used, at an engine speed of 1,600 rpm and an output torque of 40 Nm. In the experiments, the temperature $T_c$ is maintained at about 325° C., i.e., $NH_3$ in the exhaust gas is converted to $N_2$ and NO. Further, the excess air ratio $\lambda$ of the engine is feedback controlled at $\lambda=1.02$.

In FIGS. 9 and 10, the symbols (I) to (VI) correspond to the portions indicated by the same symbols (I) to (VI) in FIGS. 1 and 8.

For example, the exhaust gas from the engine contains $NO_x$ of 2,000 ppm and large amounts of HC and CO at the outlet of the engine (FIG. 9, (I)) in the case of the embodiment in FIG. 1. At the outlet of the three-way reducing and oxidizing catalyst 11, all of $NO_x$ in the exhaust gas is converted to $N_2$ and $NH_3$, and the amounts of HC and CO are also reduced (FIG. 9, (II)). The exhaust gas downstream of the three-way reducing and oxidizing catalyst 11 diverges into the branch exhaust passages 4a and 4b, and ¾ of the total amount of the exhaust gas flows into the oxidizing catalyst 13 (FIG. 9, (III)). Since the exhaust gas is diluted by the secondary air, the concentrations of the respective components are lowered at the inlet of oxidizing catalyst 13. In the oxidizing catalyst 13, all $NH_3$ in the exhaust gas (95 ppm) is oxidized by the catalyst, and same amount of $NO_2$ (95 ppm) is produced (FIG. 9, (IV)). This exhaust gas is then mixed with the exhaust gas passing through the branch exhaust passage 4b which contains $NH_3$, and forms the mixture of exhaust gas containing $NH_3$ and $NO_2$ having a molar ratio of 4:3 (FIG. 9, (V)). The air-fuel ratio of the mixture of the exhaust gas is maintained on a lean side of the stoichiometric air-fuel ratio ($\lambda=1.02$). After passing through the denitrating and oxidizing catalyst 15, almost all of the HC, CO, and $NO_x$ components as well as $NH_3$ component are removed from the exhaust gas (FIG. 9, (VI)). Further, as seen from FIG. 10, similar results are obtained at the outlet of the denitrating and oxidizing catalyst 15 also in the embodiment in FIG. 8.

It will be understood that, according to the embodiments explained above, all NO component produced by the engine is first converted to $N_2$ and $NH_3$, and a part of this $NH_3$ is converted to $NO_x$ again. Therefore, even if the amount of NO produced by the engine is charged, the molar ratio of $NH_3$ and $NO_x$ can be maintained at a predetermined ratio easily and precisely. Thus, it becomes possible to convert all $NH_3$ and $NO_x$ in the exhaust gas to $N_2$ and $H_2O$ by the denitrating and oxidizing catalyst without producing any surplus $NH_3$ and $NO_x$.

Figure 11:
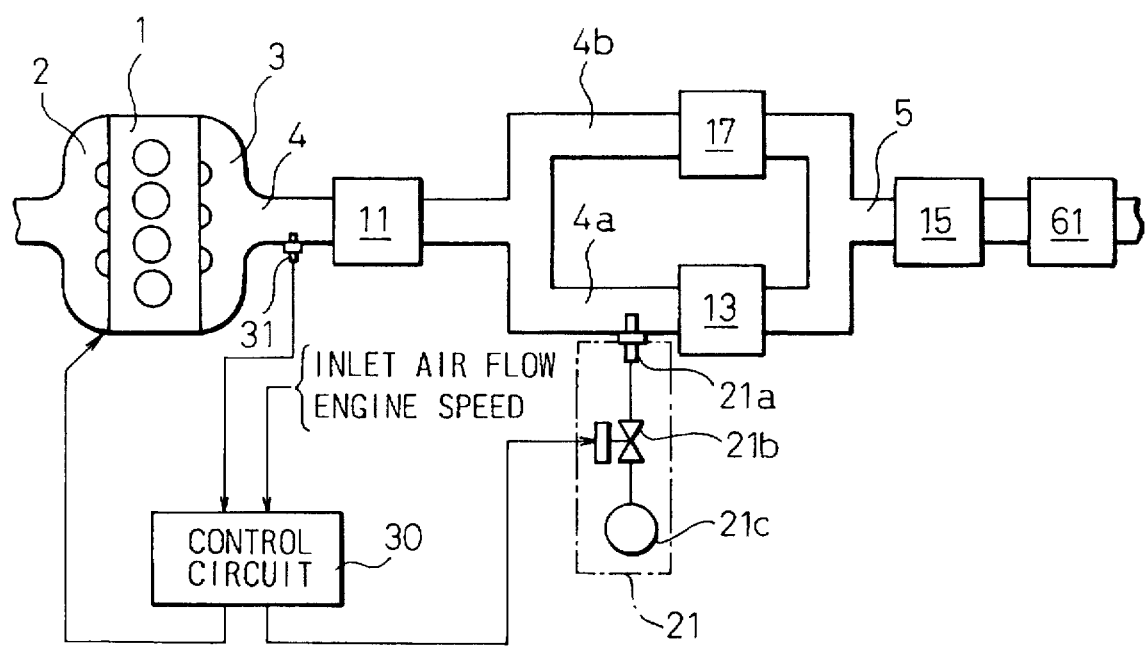
FIG. 11 is a drawing schematically illustrating another embodiment of the present invention.

Next, another embodiment of the present invention is explained with reference to FIG. 11. The embodiment in FIG. 11 is different from the embodiment in FIG. 1 in that a $NH_3$ decomposing catalyst 61 is further provided on the exhaust gas passage downstream of the denitrating and oxidizing catalyst 15. The reference numerals in FIG. 11 which are the same as those in FIG. 1 indicate similar elements as shown in FIG. 1. Further, the flow distribution ratio of the first and the second branch exhaust passages 4a and 4b are set at the fixed value of 3:4 in this embodiment.

The $NH_3$ decomposing catalyst 61 has a substitute made of, for example, zeolite ZSM5, and catalytic components such as copper Cu and platinum Pt are coated on the substrate. The $NH_3$ decomposing catalyst 61 oxidizes $NH_3$ under the presence of oxygen, and decomposes $NH_3$ into $N_2$ and $NH_3$ without producing $NO_x$.

In this embodiment, since the flow distribution ratio of branch exhaust passages 4a and 4b is fixed to 3:4, the molar ratio of $NH_3$ and $NO_x$ in the exhaust gas flowing into the denitrating and oxidizing catalyst 15 becomes stoichiometric only when all the $NH_3$ in the exhaust gas is converted to $NO_2$ by the oxidizing catalyst 13. However, if $NH_3$ is converted to $NO_2$ and NO by the oxidizing catalyst 13, for example, due to the change of the temperature $T_c$ of the oxidizing catalyst 13, surplus $NH_3$ is produced by the denitrating and oxidizing catalyst 15. As explained before, 1 mole of NO reacts with only 1 mole of $NH_3$ while 1 mole of $NO_2$ reacts with ⁴⁄₃ mole of $NH_3$. Therefore, since the flow distribution ratio of the passages 4a and 4b is fixed to 3:4 in this embodiment, the amounts of $NO_x$ flowing into the denitrating and oxidizing catalyst 15 become insufficient to react with all the $NH_3$ if NO, as well as $NO_2$, is produced by the oxidizing catalyst 13, and surplus $NH_3$ is discharged from the denitrating and oxidizing catalyst 15. Even in this case, it may be possible to oxidize the surplus $NH_3$ using an oxidizing catalyst disposed downstream of the denitrating and oxidizing catalyst 15. However, if an oxidizing catalyst is used, $NH_3$ is rather converted to $NO_x$ again by the oxidizing catalyst, and the amount of $NO_x$ discharged to atmosphere increases.

In this embodiment, this problem is solved by providing the $NH_3$ decomposing catalyst 61 on the exhaust gas passage downstream of the denitrating and oxidizing catalyst 15. Since the $NH_3$ discharged from the denitrating and oxidizing catalyst 15 is decomposed to $N_2$ and $H_2O$ by the $NH_3$ decomposing catalyst 61 without producing $NO_x$, the exhaust gas downstream of the $NH_3$ decomposing catalyst 61 can be kept free from $NO_x$ even when NO is produced by the oxidizing catalyst 13. Therefore, though the flow distribution ratio of the passages 4a and 4b are set at a fixed value in this embodiment, $NO_x$ can be removed from the exhaust gas over a wide temperature range of the oxidizing catalyst 13. In this embodiment, if the amount of the secondary air from the secondary air supply unit 21 deviates from the target value, NO is also produced by the oxidizing catalyst 13, and surplus $NH_3$ will be produced by the denitrating and oxidizing catalyst 15. However by disposing the $NH_3$ decomposing catalyst 61 at downstream of the denitrating and oxidizing catalyst 15, the surplus $NH_3$ can be decomposed to $N_2$ and $H_2O$ by the $NH_3$ decomposing catalyst 61 also in this case, and completely removed from the exhaust gas.

Figure 12:
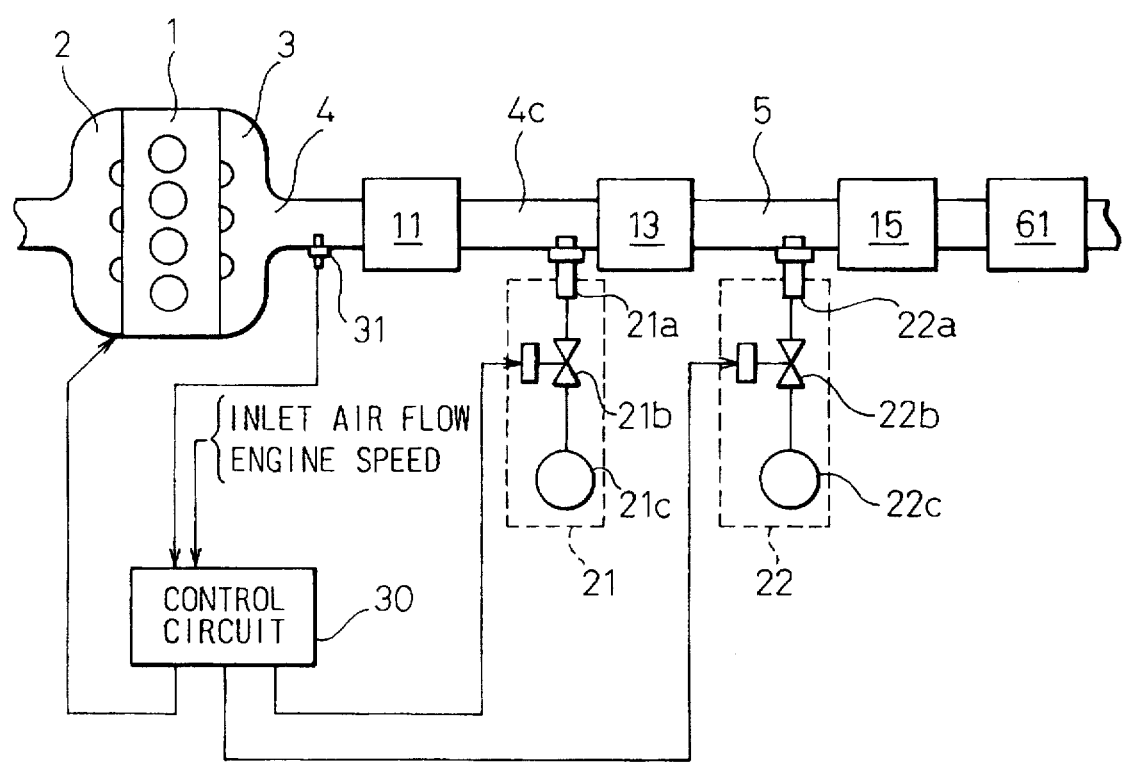
FIG. 12 is a drawing schematically illustrating another embodiment of the present invention.

FIG. 12 shows an embodiment in which the $NH_3$ decomposing catalyst 61 is applied to the embodiment in FIG. 8. In this embodiment, the amount of the secondary air from the secondary air supply unit is set at a fixed value required for oxidizing catalyst 13 to convert 3/7 of total $NH_3$ to $NO_x$. Though NO is produced by the oxidizing catalyst 13 when the temperature of the oxidizing catalyst 13 changes, the surplus $NH_3$ produced by the denitrating and oxidizing catalyst 15 is decomposed to $N_2$ and $H_2O$ by the $NH_3$ decomposing catalyst 61.

Although the engines are operated at a rich air-fuel ratio in the above embodiments, the present invention can be also applied to an engine operated at a lean air-fuel ratio. In this case, the air-fuel ratio of the exhaust gas is adjusted by supplying an air-fuel ratio adjusting agent such as a fuel or gaseous or liquid hydrocarbon in such a manner that the air-fuel ratio of the exhaust gas flowing into the three-way reducing and oxidizing catalyst becomes slightly lower than the stoichiometric air-fuel ratio (for example, λ=0.995).

We claim:

1. An exhaust gas purification device for an internal combustion engine comprising:

a ratio determining means disposed in an exhaust gas passage of an internal combustion engine for converting substantially all of $NO_x$ in the exhaust gas into $N_2$, $NH_3$ and $NO_x$, wherein an amount of $NH_3$ and an amount of $NO_x$ generated by the conversion are adjusted so that the amount of $NH_3$ and the amount of $NO_x$ are stoichiometrical, and wherein the $NO_x$ generated by the conversion is essentially $NO_2$ and a molar ratio of the amount of $NO_2$ generated to the amount of $NH_3$ generated is 3:4; and purification means disposed in the exhaust gas passage downstream of the ratio determining means for causing the $NH_3$ generated to react with $NO_x$ generated to produce $N_2$ and $H_2O$ components.

2. An exhaust gas purification device for an internal combustion engine comprising:

a ratio determining means disposed in an exhaust gas passage of an internal combustion engine for converting substantially all of $NO_x$ in the exhaust gas into $N_2$, $NH_3$ and $NO_x$, wherein an amount of $NH_3$ and an amount of $NO_x$ generated by the conversion are adjusted so that the amount of $NH_3$ and the amount of $NO_x$ are stoichiometrical, wherein the $NO_x$ generated is essentially composed of $NO_2$, and wherein a molar ratio of the amount of $NO_2$ generated to the amount of $NH_3$ generated is 1:1; and purification means disposed in the exhaust gas passage downstream of the ratio determining means for causing the $NH_3$ generated to react with $NO_x$ generated to produce $N_2$ and $H_2O$ components.

3. An exhaust gas purification device for an internal combustion engine comprising:

a ratio determining means disposed in an exhaust gas passage of an internal combustion engine for converting substantially all of $NO_x$ in the exhaust gas into $N_2$, $NH_3$ and $NO_x$, wherein an amount of $NH_3$ and an amount of $NO_x$ generated by the conversion are adjusted so that the amount of $NH_3$ and the amount of $NO_x$ are stoichiometrical, wherein the $NO_x$ generated is composed of a mixture of $NO_2$ and NO, and wherein a ratio of total moles of $NO_2$ and NO generated to an amount of moles of $NH_3$ generated is larger than 3/4 and smaller than 1: and purification means disposed in the exhaust gas passage downstream of the ratio determining means for causing the $NH_3$ generated to react with $NO_x$ generated to produce $N_2$ and $H_2O$ components.

4. An exhaust gas purification device for an internal combustion engine comprising:

a ratio determining means disposed in an exhaust gas passage of an internal combustion engine for converting substantially all of $NO_x$ in the exhaust gas into $N_2$, $NH_3$ and $NO_x$, wherein an amount of $NH_3$ and an amount of $NO_x$ generated by the conversion are adjusted so that the amount of $NH_3$ and the amount of $NO_x$ are stoichiometrical, wherein said ratio determining means comprises:

$NH_3$ generating means for converting substantially all of the $NO_x$ in the exhaust gas into $N_2$ and $NH_3$; and $NO_x$ generating means for converting a portion of the $NH_3$ generated by the $NH_3$ generating means into $NO_x$, wherein the amount of $NO_x$ generated by the $NO_x$ generating means and an amount of $NH_3$ remaining in the exhaust gas are adjusted so that the amount of $NO_x$ and the remaining amount $NH_3$ are stoichiometrical; and purification means disposed in the exhaust gas passage downstream of the ratio determining means for causing the $NH_3$ generated to react with $NO_x$ generated to produce $N_2$ and $H_2O$ components.

5. A device according to claim 4, wherein said $NO_x$ generating means converts 3/7 of the amount of the $NH_3$ component generated by the $NH_3$ generating means into an $NO_2$ component.

6. A device according to claim 4, wherein said $NO_x$ generating means converts 1/2 of the amount of the $NH_3$ component generated by the $NH_3$ generating means into an NO component.

7. A device according to claim 4, wherein said $NO_x$ generating means converts between $3/7$ and $1/2$ of the amount of the $NH_3$ component generated by the $NH_3$ generating means into $NO_2$ and NO components.

8. A device according to claim 4, wherein said $NO_x$ generating means comprises:
- a first branch exhaust passage and a second branch exhaust passage which divide the exhaust gas flow containing the $NH_3$ generated by the $NH_3$ generating means into a first portion and a second portion, respectively;
- a converting means disposed on said first branch exhaust passage for converting substantially all of the $NH_3$ in the first portion of the exhaust gas into $NO_x$; and
- an exhaust gas outlet passage merging the first and second branch exhaust passages, where the first and second portions of the exhaust gas mix with each other;
- wherein an amount of the first portion of the exhaust gas and an amount of the second portion of the exhaust gas are adjusted so that the amount of the $NO_x$ generated by the converting means and the amount of $NH_3$ in the second portion of the exhaust gas are stoichiometrical.

9. A device according to claim 8, wherein the converting means converts substantially all of the $NH_3$ in the first portion of the exhaust gas into an $NO_2$ component, and wherein the ratio of the amount of the first portion of the exhaust gas to the amount of the second portion of the exhaust gas is 3:4.

10. A device according to claim 8, wherein the converting means converts substantially all of the $NH_3$ in the first portion of the exhaust gas into an NO component, and wherein the ratio of the amount of the first portion of the exhaust gas to the amount of the second portion of the exhaust gas is 1:1.

11. A device according to claim 8, wherein the converting means converts substantially all of the $NH_3$ in the first portion of the exhaust gas into $NO_2$ and NO components, and wherein the ratio of the amount of the first portion of the exhaust gas to the amount of the second portion of the exhaust gas is larger than 3:4 and smaller than 1:1.

12. A device according to claim 8, wherein said $NO_x$ generating means further comprises a flow resistance means disposed on the second branch exhaust passage for generating a flow resistance substantially the same as the flow resistance generated by said converting means in the first branch exhaust passage.

13. A device according to claim 11, wherein said $NO_x$ generating means further comprises a flow resistance means disposed in the second branch exhaust passage for generating a flow resistance substantially the same as the flow resistance generated by said converting means in the first branch exhaust passage.

14. A device according to claim 4, wherein said $NH_3$ generating means comprises a three-way reducing and oxidizing catalyst disposed in the exhaust gas passage, said $NO_x$ generating means comprises an oxidizing catalyst disposed in the exhaust gas passage downstream of said three-way reducing and oxidizing catalyst, and said purification means comprises a denitrating and oxidizing catalyst disposed in the exhaust gas passage downstream of said oxidizing catalyst.

15. A device according to claim 7, wherein said $NH_3$ generating means comprises a three-way reducing and oxidizing catalyst disposed in the exhaust gas passage, said $NO_x$ generating means comprises an oxidizing catalyst disposed in the exhaust gas passage downstream of said three-way reducing and oxidizing catalyst, and said purification means comprises a denitrating and oxidizing catalyst disposed in the exhaust gas passage downstream of said oxidizing catalyst.

16. A device according to claim 15, wherein said $NO_x$ generating means further comprises a variable means for adjusting the amount of the $NH_3$ converted by said $NO_x$ generating means in the range between $3/7$ and $1/2$ of the amount of the $NH_3$ generated by said $NH_3$ generating means in accordance with the temperature of said oxidizing catalyst.

17. A device according to claim 8, wherein said $NH_3$ generating means comprises a three-way reducing and oxidizing catalyst disposed in the exhaust gas passage, said converting means comprises an oxidizing catalyst disposed in the first branch exhaust passage, and said purification means comprises a denitrating and oxidizing catalyst disposed in the exhaust gas outlet passage.

18. A device according to claim 12, wherein said $NH_3$ generating means comprises a three-way reducing and oxidizing catalyst disposed in the exhaust gas passage, said converting means comprises an oxidizing catalyst disposed in the first branch exhaust passage, and said purification means comprises a denitrating and oxidizing catalyst disposed in the exhaust gas outlet passage.

19. A device according to claim 13, wherein said $NH_3$ generating means comprises a three-way reducing and oxidizing catalyst disposed in the exhaust gas passage, said converting means comprises an oxidizing catalyst disposed in the first branch exhaust passage, and said purification means comprises a denitrating and oxidizing catalyst disposed in the exhaust gas outlet passage.

20. A device according to claim 18, wherein said $NO_x$ generating means comprises a variable means for adjusting the ratio of the amount of the first portion of the exhaust gas to the amount of the second portion of the exhaust gas to maintain the ratio in the range between $3/4$ and 1, in accordance with the temperature of the oxidizing catalyst.

21. A device according to claim 19, wherein said $NO_x$ generating means comprises a variable means for adjusting the ratio of the amount of the first portion of the exhaust gas to the amount of the second portion of the exhaust gas to maintain the ratio in the range between $3/4$ and 1, in accordance with the temperature of the oxidizing catalyst.

22. A device according to claim 1, wherein said engine is operated at an air-fuel ratio lower than the stoichiometric air-fuel ratio.

23. A device according to claim 4, wherein said engine is operated at an air-fuel ratio lower than the stoichiometric air-fuel ratio.

24. A device according to claim 8, wherein said engine is operated at an air-fuel ratio lower than the stoichiometric air-fuel ratio.

25. A device according to claim 14, wherein said engine is operated at an air-fuel ratio lower than the stoichiometric air-fuel ratio.

26. A device according to claim 15, wherein said engine is operated at an air-fuel ratio lower than the stoichiometric air-fuel ratio.

27. A device according to claim 17, wherein said engine is operated at an air-fuel ratio lower than the stoichiometric air-fuel ratio.

* * * * *

UNITED STATES PATENT AND TRADEMARK OFFICE
CERTIFICATE OF CORRECTION

PATENT NO. : 5,746,052  Page 1 of 3
DATED : May 5, 1998
INVENTOR(S): Yukio KINUGASA, et al.

It is certified that error appears in the above-identified patent and that said Letters Patent is hereby corrected as shown below:

ABSTRACT line 2, delete "a" before "first" and delete "a" before "second".

Column 1, line 63, change "produce" to --produces--.

Column 4, line 3, change "the all of" to --all of the--.

Column 4, line 26, change "a" to --an--.

Column 6, line 11, change "a" to --an--.

Column 6, line 50, change "No$_x$" to --NO$_x$--.

Column 9, line 15, change "are" to --is--.

Column 9, line 52, change "NO$_x$produced" to --NO$_x$ produced--.

Column 10, line 10, change "is" to --are--.

Column 10, line 12, change "component" to --components--

Column 11, line 11, delete "flows" at beginning of line.

Column 11, line 13, insert --which-- after "gas".

UNITED STATES PATENT AND TRADEMARK OFFICE
CERTIFICATE OF CORRECTION

PATENT NO. : 5,746,052
DATED : May 5, 1998
INVENTOR(S) : Yukio KINUGASA, et al.

It is certified that error appears in the above-identified patent and that said Letters Patent is hereby corrected as shown below:

Column 11, line 19, after "react" insert --with--.

Column 11, line 58, change "reacts" to --react-- and insert --with-- right after.

Column 12, line 48, after "most" insert --common--.

Column 14, line 41, change "relationships" to --relationship--.

Column 14, line 14, change "relationships" to --relationship--.

Column 14, line 61, change "relationships" to --relationship--.

Column 14, line 58, change "relationships" to --relationship--.

Column 14, line 65, change "relationships" to --relationship--.

UNITED STATES PATENT AND TRADEMARK OFFICE
CERTIFICATE OF CORRECTION

PATENT NO. : 5,746,052
DATED : May 5, 1998
INVENTOR(S) : Yukio KINUGASA, et al.

It is certified that error appears in the above-identified patent and that said Letters Patent is hereby corrected as shown below:

Column 16, line 40, change "$NO_x$produced" to --$NO_x$ produced--.

Column 16, line 53, before "passes" insert --which--.

Column 17, line 57, change "corresponds" to --correspond--

Column 20, line 11, change "$NO_x$generated" to --$NO_x$ generated--.

Column 20, line 54, after "amount" insert --of--.

Column 21, line 21, change "$NO_x$generated" to --$NO_x$ generated--.

Signed and Sealed this

Eighth Day of December, 1998

Attest:

BRUCE LEHMAN

Attesting Officer     Commissioner of Patents and Trademarks